(12) United States Patent
Huynh et al.

(10) Patent No.: US 7,451,389 B2
(45) Date of Patent: Nov. 11, 2008

(54) METHOD AND SYSTEM FOR SEMANTICALLY LABELING DATA AND PROVIDING ACTIONS BASED ON SEMANTICALLY LABELED DATA

(75) Inventors: Tuan Huynh, Seattle, WA (US); Nobuya Higashiyama, Sammamish, WA (US); Ziyi Wang, Redmond, WA (US); Jeff Reynar, Woodinville, WA (US); Michael Ammerlaan, Sammamish, WA (US); Roger Wolff, Sammamish, WA (US); Kevin B. Gjerstad, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1304 days.

(21) Appl. No.: 10/184,556

(22) Filed: Jun. 27, 2002

(65) Prior Publication Data

US 2002/0198909 A1    Dec. 26, 2002

Related U.S. Application Data

(63) Continuation-in-part of application No. 09/588,411, filed on Jun. 6, 2000.

(51) Int. Cl.
*G06F 15/00* (2006.01)
*G06F 17/00* (2006.01)
(52) U.S. Cl. ................. 715/230; 715/210; 715/243
(58) Field of Classification Search ............. 715/541, 715/512, 516, 513, 230, 210, 243
See application file for complete search history.

(56) References Cited

U.S. PATENT DOCUMENTS 4,674,065 A    6/1987    Lange et al.

(Continued)

FOREIGN PATENT DOCUMENTS

EP        0 810 520 B1    12/1998
WO     WO 01/86390 A2    11/2001

OTHER PUBLICATIONS

Perry et al., "Discovering Similar Resources by Content Part-Linking", Proceedings of the Sixth International Conference on Information and Knowledge Management, published by ACM Press 1997, pp. 317-324.*

(Continued)

*Primary Examiner*—William L Bashore
(74) *Attorney, Agent, or Firm*—Christensen O'Connor Johnson Kindness PLLC

(57) ABSTRACT

A method for recognizing data, including strings and media objects, and annotating, or labeling, the data with a type label. After the data is annotated with a type label, application program modules may use the type label to provide users with a choice of actions. If the user's computer does not have any actions associated with a type label, the user may be provided with the option to surf to a download Uniform Resource Locator (URL) and download action plug-ins for that type label. One or more recognizer plug-ins perform the recognition of particular strings or media objects in an electronic document. The recognizer plug-ins may be packaged with an application program module or they may be written by third parties to recognize particular data that is of interest. One or more action plug-ins provide possible actions to be presented to the user based upon the type label associated with the data in an electronic document.

71 Claims, 9 Drawing Sheets

U.S. PATENT DOCUMENTS

| | | | |
|---|---|---|---|
| 5,267,155 | A | 11/1993 | Buchanan et al. |
| 5,392,386 | A | 2/1995 | Chalas |
| 5,446,891 | A | 8/1995 | Kaplan et al. |
| 5,550,976 | A * | 8/1996 | Henderson et al. .......... 709/201 |
| 5,617,565 | A | 4/1997 | Augenbraun et al. |
| 5,640,560 | A | 6/1997 | Smith |
| 5,708,825 | A | 1/1998 | Sotomayor |
| 5,717,923 | A | 2/1998 | Dedrick |
| 5,752,022 | A | 5/1998 | Chiu et al. |
| 5,794,257 | A | 8/1998 | Liu et al. |
| 5,802,299 | A | 9/1998 | Logan et al. |
| 5,802,530 | A | 9/1998 | Van Hoff |
| 5,815,830 | A | 9/1998 | Anthony |
| 5,822,539 | A | 10/1998 | van Hoff |
| 5,826,025 | A | 10/1998 | Gramlich |
| 5,859,636 | A * | 1/1999 | Pandit ..................... 715/501.1 |
| 5,895,461 | A | 4/1999 | De La Huerga et al. |
| 5,946,647 | A | 8/1999 | Miller et al. |
| 5,948,061 | A | 9/1999 | Merriman et al. |
| 5,974,413 | A * | 10/1999 | Beauregard et al. ............ 707/6 |
| 5,991,714 | A * | 11/1999 | Shaner .......................... 704/9 |
| 6,006,265 | A | 12/1999 | Rangan et al. |
| 6,085,201 | A | 7/2000 | Tso |
| 6,092,074 | A | 7/2000 | Rodkin et al. |
| 6,122,647 | A | 9/2000 | Horowitz et al. |
| 6,272,505 | B1 | 8/2001 | De La Huerga |
| 6,308,171 | B1 | 10/2001 | De La Huerga |
| 6,323,853 | B1 | 11/2001 | Hedloy |
| 6,349,295 | B1 | 2/2002 | Tedesco et al. |
| 6,405,199 | B1 * | 6/2002 | Carter et al. ................... 707/6 |
| 6,415,256 | B1 * | 7/2002 | Ditzik ........................ 704/231 |
| 6,516,321 | B1 | 2/2003 | De La Huerga |
| 6,618,733 | B1 * | 9/2003 | White et al. ............. 707/103 Y |
| 6,629,097 | B1 * | 9/2003 | Keith ............................ 707/5 |
| 6,658,377 | B1 * | 12/2003 | Anward et al. .................. 704/9 |
| 6,704,739 | B2 * | 3/2004 | Craft et al. .................. 707/102 |

OTHER PUBLICATIONS

Devanbu, P., et al., "CHIME: Customizable Hyperlink Insertion and Maintenance Engine for Software Engineering Environments," *Proceedings of International Conference on Software Engineering*, Los Angeles, May 16-22, 1999.

"Intelligent Text Processing: About," Syntalex Limited, Mar. 15, 1999, <http://www.syntalex.co.uk/about/about.html> [accessed Aug. 7, 1999].

"Intelligent Text Processing: Automatic Cross-Referencing," Syntalex Limited, Jan. 22, 1999, <http://www.syntalex.co.uk/services/acr1.html> [accessed Aug. 7, 1999].

"Intelligent Text Processing: Case Study: Context Electronic Publishers JUSTIS," Syntalex Limited, Mar. 23. 1999, <http://www.syntalex.co.uk/casestudies/context.html> [accessed Aug. 7, 1999].

"Using Flyswat," © 1999 flyswat, <http://www.flyswat.com/using.html> [accessed Sep. 28, 1999].

"What Is Flyswat?"© 1999 flyswat, <http://www.flyswat.com> [accessed Sep. 28, 1999].

*AppleData Detectors User's Manual*, Apple Computer, Inc., 1997.

Beitner, N.D., et al., "Multimedia Support and Authoring in Microcosm: An Extended Model," Department of Electronics and Computer Science, University of Southampton, and Department of Computer Science, University of Manchester, GB, n.d.

*Claris Emailer Getting Started*, Claris Corporation, Santa Clara, California, 1995-1997.

*Corel InfoCentral User's Manual*, vol. 1, Version 7, Corel Corporation Limited, Ottawa, Canada, 1996.

*Corel Office Professional 7* User's Manual, Corel Corporation Limited, Ottawa, Canada.

*Developer's Guide to Apple Data Detectors* (for version 1.0.2), Apple Computer, Inc., Cupertino, California, 1997.

*Getting Results with Microsoft Office 97*, Microsoft Corporation, 1995-1997.

*Groupwise User's Guide for Windows 16-Bit*, Version 5.2, Novell, Inc., Orem, Utah, 1993-1997.

*Groupwise User's Guide for Windows 32-Bit*, Novell, Inc., Orem, Utah, 1998.

*Ispell UNIX Operating System help pages* ("*Man" pages*), Computer Science Course Handout No. 38 from Emporia State University, Kansas, n.d., <http://courses.cs.emporia.edu/pheattch/courses/2002/cs501s02/hand38> [retrieved Aug. 23, 2003], 3 pages.

*Ispell UNIX Operating System help pages* ("*Man" pages*), described as being for International Ispell Version 3.1.00, Oct. 8, 1993, <http://www.rt.com/inan/Gndaffix.1.html> [retrieved Aug. 23, 2003], 15 pages.

*Ispell UNIX Operating System help pages* ("*Man" pages*), for SunOS Version 5.6, described as being for International Ispell Version 3.1.00, Oct. 8, 1993, University of South Florida's Web site, <http://www.csee.usf.edu/cgi-bin/man-cgi?ispell> [retrieved Aug. 23, 2003], 18 pages.

*Ispell UNIX Operating System Man help pages*, BigBiz Internet Services Web site, n.d., <http://www.bigbiz.com/cgi-bin/manpage?4+ispell.html> [retrieved Aug. 23, 2003], 11 pages.

Kuenning, G., *International Ispell*, n.d., <http://fmg-www.cs.ucla.edu/geoff/ispell.html> [retrieved Aug. 23, 2003], 3 pages.

Kuenning, G., *Ispell Version 3.1*, n.d., <http://theochem.ki.ku.dk.on_line_docs/ispell/ispell_1.html> [retrieved Aug. 23, 2003], 4 pages.

McMahon, L.E., "SED—A Non-interactive Text Editor, " Bell Laboratories, Murray Hill, New Jersey, Aug. 15, 1978.

"Multimedia Hyperlinks Automatically Created for Reference Documents," IBM Technical Disclosure Bulletin No. 368, Jun. 1993.

Nardi, B.A., et al., "Collaborative, Programmable Ingelligent Agents," Apple Computer Advanced Technology Group, Mar. 1998, <http://www.miramontes.com/writing/add-cacm/add-cacm.html>, 11 pages.

Phelps, R., "Illustrated UNIX System V/BSD," *Spell UNIX Operating System help pages* ("*Man" pages*) excerpt, Jan. 1992, <http://duplex.hypermart.net/books/bsd/501-504.html> [retrieved Aug. 22, 2003], 4 pages.

"SED stream editor UNIX Operating System help pages ('Man' pages)," *BSD Reference manual for the BSDI BSD UNIX Operating System*, Dec. 30, 1993, 6 pages.

Spell, Spellin, Spellout UNIX Operating System help pages ('Man' pages), University of Minnesota School of Physics & Astronomy's Web site, <http://www.physics.umn.edu/cgi-bin/man-cgi?spell> [retrieved Aug. 23, 2003], 5 pages.

Spell, Spellin, Spellout UNIX Operating System help pages ('Man' pages), University of Osnabrück Web site, <http://www.vorlesungen.uni-osnabrueck.de/informatik/shellscrip/Html/Man/_Man_NeXT_html/htmll/spell.1.html> [retrieved Aug. 23, 2003], 2 pages.

"Spell UNIX Operating System help pages ('Man' pages)," Hewlett Packard, *HP-UX Release 11.00*, Oct. 1997), California Polytechnic State University's Web site, <http://www.calpoly.edu/cgi-bin/man-cgi?spell+1> [retrieved Aug. 22, 2003], 3 pages.

"Spellout Command help page ('Man' page)," *AIX Version 4.3 Commands Reference*, vol. 5, 1st ed., Oct. 1997, University of Hohenheim Rechenzentrum's Web site, <http://www.rz.uni-hohenheim.de/betriebssysteme/unix/aix/aix_4.3.3_doc/base_doc/usr/share/man/infor/en_US/a_doc_lib/cmds/aixcmds5/spellout.htm> [retrieved Aug. 23, 2003], 1 page.

*The Complete Red Hat Linux Operating System 5.2 Deluxe*, Red Hat Software, Inc., Research Triangel Park, North Carolina, 1998.

"Thread: Enhanced spell front end for GNU Emacs+detex+delatex," Geocrawler The Knowledge Archive Web site, <http://www.geocrawler.com/archives/3/337/1987/8/0/187198/>, 1 page.

*User Manual for AddressMate and AddressMate Plus*, Addressmate Software, 1994-1995.

Wynne, M., *A Course In The UNIX Operating System*, Lancaster University, UK, 1992-1997, <http://www.comp.lancs.ac.uk/computing/users/eiamjw/unix/chap8.html> [retrieved Aug. 23, 2003], 3 pages.

\* cited by examiner

METHOD AND SYSTEM FOR SEMANTICALLY LABELING DATA AND PROVIDING ACTIONS BASED ON SEMANTICALLY LABELED DATA

CROSS-REFERENCE TO RELATED APPLICATION

This application is a continuation-in-part of U.S. patent application Ser. No. 09/588,411, filed Jun. 6, 2000. The entire subject matter of application Ser. No. 09/588,411, including the entire disclosure, is incorporated herein by reference.

FIELD OF THE INVENTION

This invention relates to document creation program modules. More particularly, this invention relates to a method and system for semantically labeling data during creation of an electronic document and providing a selection of actions that may be performed based on the semantically labeled data.

BACKGROUND OF THE INVENTION

Electronic documents such as word processing documents and spreadsheet documents typically include semantic information that would be helpful if the information was recognized as such. Recognition and use of this semantic information could result in increased interoperability between desktop software applications and other desktop applications and/or web-based applications.

The ability to recognize data, such as in search engines and handwriting and speech recognition engines, is well-known. Additionally, various information retrieval systems have capabilities to label documents. For example, the LEXIS-NEXIS service provides links in some of its documents for company names, famous people and stock ticker symbols.

However, none of the services described above allow data to be labeled with semantic information on-the-fly, i.e., as a user is typing text or inserting a media object into a document and creating a document. Thus, there is a need for a method and system for semantically labeling data while a user is creating a document and providing user actions based on the type of semantic label applied to the data.

In addition to the need described above, there are other needs associated with electronic document program modules such as word processing program modules and spreadsheet program modules. There is the need for tighter integration between electronic document program modules and personal information manager program modules. For example, a user often wants to insert an address stored in a contacts folder of a personal information manager into a word processing document, such as when writing a letter. This insertion may be time-consuming. Typically, the insertion requires the user to switch from a word processing program module to the personal information manager program module, open the contacts folder, find the appropriate person in the contacts folder, copy the address from the contacts folder, switch back to the word processing program module and paste the address into the document at the appropriate place. Thus, there is a need for a tighter integration between information stored in personal information manager program modules and information needed by electronic document program modules.

There is also the need for tighter integration between web properties and the content of electronic documents. For example, sales people sometimes need directions to a client's site. The address of the client's site may be included in an e-mail message or electronic document. However, getting directions to the client's site via an Internet mapping service requires navigating to a website, entering the elements of the address into the appropriate search fields (e.g., street address, city, state, zip) and executing a search for the correct map. As another example, a company's logo may appear in an electronic document and more information about the company may be needed, such as contact information. Again, obtaining this further information about the company requires searching the Internet for the company's home page. Thus, there is the need for tighter integration between web properties and the content of electronic documents.

There is also the need for integration between information on an Intranet and the content of electronic documents because different organizations have different types of data they deem important. Certain industries, services and professions may have words and/or media objects which are commonly found in documents. For instance, in drug companies, chemical names are extremely important and there's likely to be a myriad of information about a particular chemical name on a drug company's Intranet. For car companies, the important data might be model names or part numbers. For universities, the important data might be names of professors, students or courses. In the real estate industry, the important data might be image media objects of houses, condominiums, apartments, town homes, or real estate agents. The conventional services do not allow customization of data that may be recognized. None of the conventional services allow third parties to provide (1) a recognition program module so that these customized words and/or media objects may be recognized and (2) an action program module so that appropriate actions may be taken based upon these recognized words and/or media objects. Thus, there is the need for integration between important data on an Intranet and the content of electronic documents.

Thus, there is a need for a method and system for semantically labeling data while a user is creating a document and providing user actions based on the type of semantic label. There is a further need for a tighter integration between information stored in personal information manager program modules and information needed by other program modules. There is also the need for tighter integration between web properties and the content of electronic documents. There is the further need for integration between important data on an Intranet and the content of electronic documents.

SUMMARY OF THE INVENTION

The present invention provides a method and system for semantically labeling data, such as strings of text and media objects, during creation of an electronic document and providing a selection of actions that may be performed based on the semantically labeled data.

In one aspect, the present invention provides a computer-implemented method for semantically labeling strings during creation of an electronic document. When an application program module receives a new string, such as when the user enters a new paragraph or cell value into an electronic document or edits a previously entered paragraph, the paragraph containing the new string is passed from the application program module to a recognizer DLL. The recognizer DLL is responsible for communicating with the application program module, managing the jobs that need to be performed by the recognizer plug-ins, receiving results from the recognizer plug-ins and sending semantic category information to the application program module.

During idle time, the paragraph is passed to the recognizer plug-ins. The recognizer plug-ins are executed on the paragraph to recognize keywords or perform other actions defined by the recognizer plug-in. As part of executing the recognizer plug-in, the paragraph or cell value may be broken into sentences by the recognizer plug-in. However, each recognizer plug-in is responsible for its own sentence-breaking. After the keywords are found, the results from each of the recognizer plug-ins are received by the recognizer DLL. The results from the recognizer plug-ins are compiled into semantic categories by the recognizer DLL and the semantic categories are sent to the application program module. The application program module displays the semantic categories to the user in the electronic document.

In another aspect, the present invention provides a computer implemented method for semantically labeling media objects. When an application program module receives a new media object, such as when the user copies and pastes a media object into an electronic document or modifies an embedded media object, media object data is passed from the application program module to a recognizer DLL. The recognizer DLL is responsible for communicating with the application program module, managing the jobs that need to be performed by the recognizer plug-ins, receiving results from the recognizer plug-ins, and sending semantic category information to the application program module.

During idle time, the media object data is passed to the recognizer plug-ins. The media object data may include the media object itself, a pointer to the media object, and metadata about the media object, such as a set of properties for the media object. The recognizer plug-ins are executed on the media object data to recognize semantic information or perform other actions defined by the recognizer plug-in. The recognizer plug-in may use the media object data to obtain additional semantic information about the media object. After the semantic information for the media object is found, the results from each of the recognizer plug-ins are received by the recognizer DLL. The results from the recognizer plug-ins are compiled into semantic categories by the recognizer DLL and the semantic categories are sent to the application program module. The application program module displays the semantic categories to the user in the electronic document.

These and other features, advantages, and aspects of the present invention may be more clearly understood and appreciated from a review of the following detailed description of the disclosed embodiments and by reference to the appended drawings and claims.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
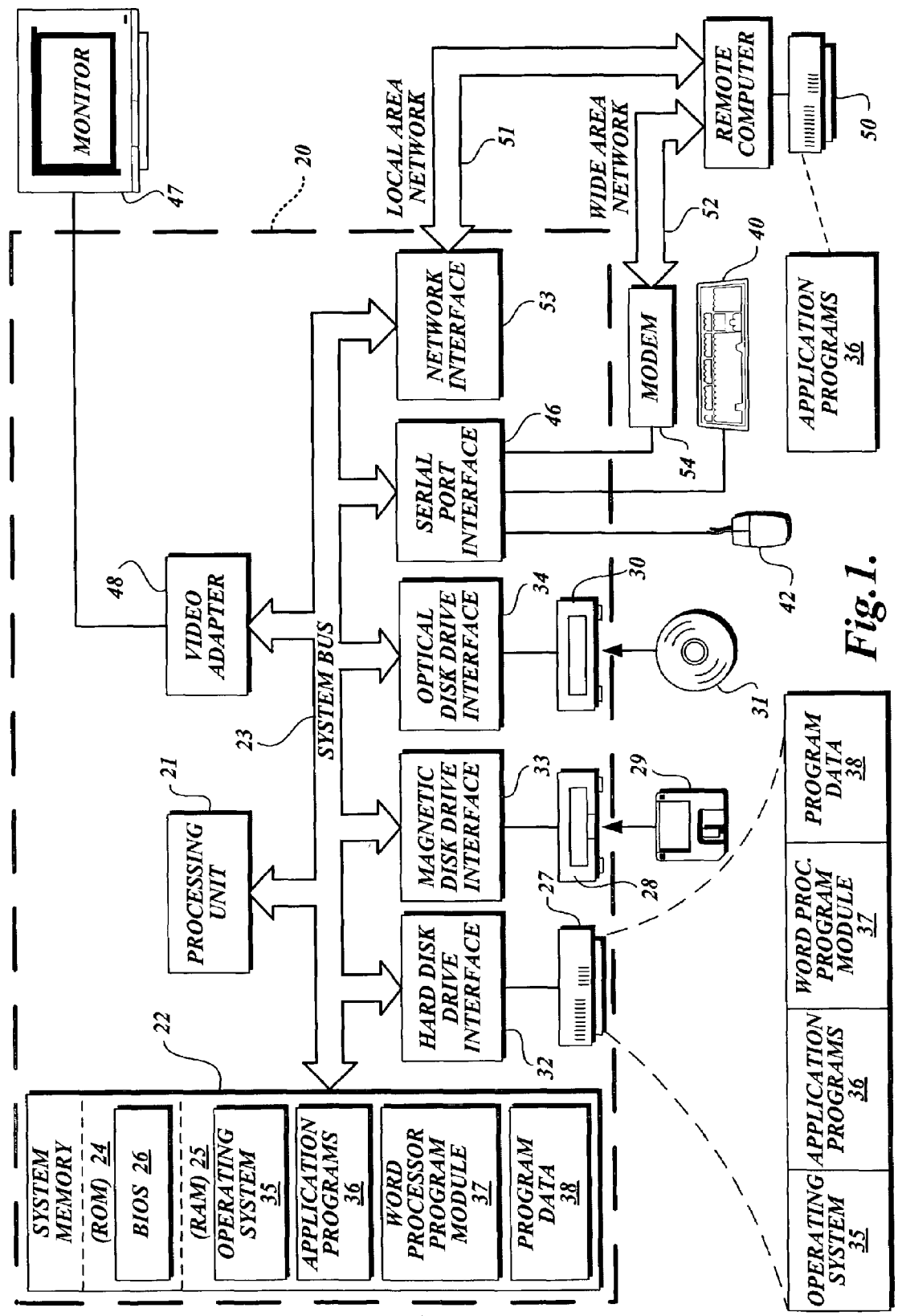
FIG. 1 is a block diagram of a computer that provides the exemplary operating environment for the present invention.

The present invention is directed toward a method and system for semantically labeling data during creation of an electronic document and providing a selection of actions that may be performed based on the semantically labeled data. The semantic labels of the present invention may be applied to any type of data added to an electronic document, such as text strings and media objects, including image objects, audio objects, digital photograph objects, clip art objects, graphic objects, handwriting objects, video clip objects, and multimedia objects. Several embodiments of the present invention are described below, including an embodiment that semantically labels strings of text in an electronic document and another embodiment that semantically labels media objects embedded in an electronic document.

In one embodiment, the invention is incorporated into a suite of application programs referred to as "OFFICE" and more particularly is incorporated into a preferred word processing application program entitled "WORD 10.0" and a preferred spreadsheet application program entitled "EXCEL 10.0," both marketed by Microsoft Corporation of Redmond, Wash. Briefly described, the preferred application programs allow a user to create and edit electronic documents by entering characters, symbols, graphical objects, and commands.

In one embodiment, the invention comprises recognizing strings and annotating, or labeling, the strings with a type label. A string is defined as a data structure composed of a sequence of characters usually representing human-readable text. After the strings are annotated with a type label, application program modules may use the type label to provide users with a choice of actions. If the user's computer does not have any actions associated with that type label, the user may be provided with the option to surf to a download Uniform Resource Locator (URL) and download action plug-ins for that type label.

Having briefly described an embodiment of the present invention, an exemplary operating environment for the present invention is described below.

Exemplary Operating Environment

Referring now to the drawings, in which like numerals represent like elements throughout the several figures, aspects of the present invention and the exemplary operating environment will be described.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, a word processor program module 37 (or a spreadsheet program module), program data 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
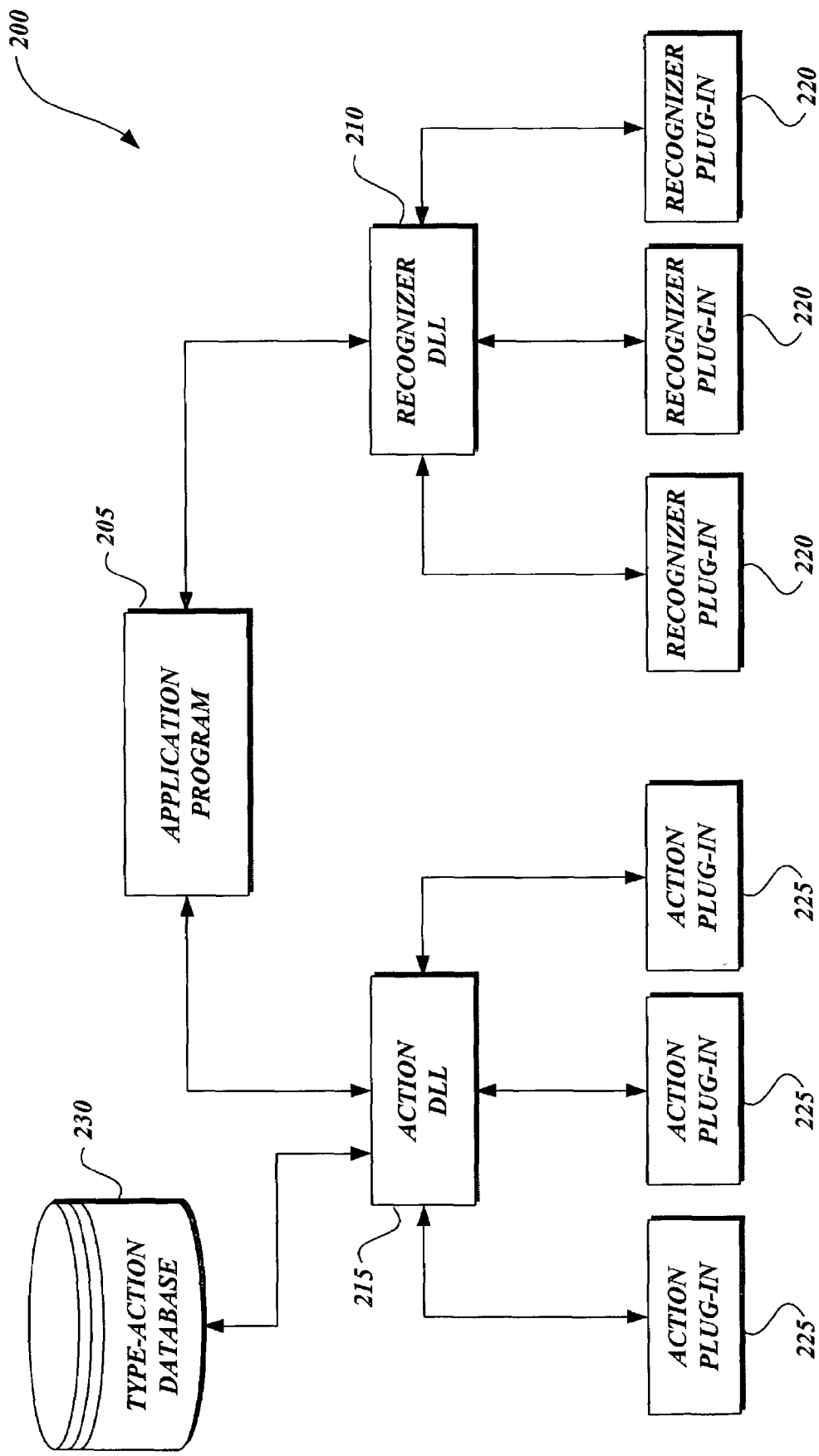
FIG. 2 is a block diagram illustrating an exemplary architecture for use in conjunction with an embodiment of the present invention.

FIG. 2 is a block diagram illustrating an exemplary architecture 200 for use in conjunction with an embodiment of the present invention. The architecture includes an application program module 205, such as word processor program module 37 (FIG. 1). The application program module 205 is able to communicate with a recognizer dynamic-link library 210 (hereinafter recognizer DLL) and an action dynamic-link library 215 (hereinafter action DLL) as a user is creating or editing an electronic document. The recognizer DLL 210 controls a number of recognizer plug-ins 220. The action DLL 215 controls a number of action plug-ins 225. The action DLL also controls a type-action database 230.

In a preferred embodiment, the action plug-ins and recognizer plug-ins are Automation Servers. Automation Servers are well-known software components which are assembled into programs or add functionality to existing programs running on the Microsoft WINDOWS® operating system. Automation Servers may be written in a variety of computing languages and can be unplugged from a program at run time without having to recompile the program.

The recognizer DLL 210 handles the distribution of strings from the electronic document running on the application program module 205 to the individual recognizer plug-ins 220. The recognizer plug-ins 220 recognize particular data in an electronic document, such as a word processing document or a spreadsheet document. The recognizer plug-ins 220 may be packaged with the application program module 205 or they may be written by third parties to recognize particular strings that are of interest. Typically, the recognizer DLL 210 passes data to the recognizer plug-ins 220 in one paragraph or cell value increments.

As part of recognizing certain data as including semantic information, the recognizer plug-ins 220 determine which data is to be labeled and how it is to be labeled. After receiving these results from the various recognizer plug-ins 220, the recognizer DLL 210 sends semantic categories to the application program module. In a preferred embodiment, a semantic category comprises the recognized data, a type label, and a download URL. A semantic category may also comprise metadata. The recognizer plug-ins 220 each run separately and the recognizer DLL 210 is responsible for handling the asynchronicity that results from different recognizer plug-ins returning results with different delays.

After data, such as a string or a media object, is labeled by a recognizer plug-in 220 and a semantic category is sent to the application program module 205, the user of the application program module 205 will be able to execute actions that are associated with the type label of the semantic category. The action DLL 215 manages the action plug-ins 225 that are run to execute the actions. As with the recognizer plug-ins 220, the action plug-ins 225 may be packaged with the application program module 205 or written by third parties to perform particular actions that are of interest to the third party. The action plug-ins provide possible actions to be presented to the user based upon the type label associated with the data. The action DLL 215 determines what type label the semantic category is and cross-references the type label in the type-action database 230 with a list of actions to determine what actions to present to the user. It should be understood that, in a preferred embodiment, the type-action database is not used. Instead, the list of actions is dynamically generated for each type by looking in the registry to determine which actions are installed and then querying the action DLLs to determine which types they apply to.

After the user chooses an action, the action DLL 215 manages the appropriate action plug-ins 225 and passes the necessary information between the action plug-ins and the application program module 205 so that the action plug-in may execute the desired action. Typically, the application program module sends the action DLL an automation request to invoke the action the user has selected.

As described above, the combination of the recognized data, type label, metadata and download URL is referred to herein as a semantic category. The type label is a semantic information label. The semantic category may also comprise metadata, which are hidden properties of the semantic category. An example of a semantic category may clarify the definition. Suppose a user enters the text "Gone With the Wind" into an electronic document. The string "Gone With the Wind" may be identified as a semantic category of type label "Book Title" and of type label "Movie Title." In addition, metadata such as the ISBN number may be returned by the recognizer plug-in to the application program module as part of the semantic category. A download URL may be provided with the type labels "Book Title" and "Movie Title" in case the user's machine has not stored action plug-ins for these type labels. For example, an action for the type label "Book Title" may be "Buy this Book" from an online retailer. If the user does not have the action plug-in DLL 225 corresponding to "Buy this Book," then the download URL may be used to navigate the user's web browser to an appropriate website to download this action plug-in.

It should also be understood that the present invention, in a preferred embodiment, also recognizes sequences of capitalized words that contain function words, and which are likely to be special, but for which there is no type label information. These strings are typically labeled by a grammar checker program module.

The actions provided for a semantic category may utilize both the type label and the recognized data, such as the text of a recognized string or metadata about a recognized media object. For example, a word processor program module may use a grammar checker as a recognizer plug-in to label strings that are person names. After a string has been labeled as a person's name, the word processor program module may, through a standard user interface mechanism, allow users to execute pertinent actions, such as looking up the person's name in the contacts folder in a personal information manager program module, sending electronic mail, or searching for the person's name in an HR database.

Having described an exemplary architecture, for semantically labeling data during document creation, an exemplary method 300 for semantically labeling strings during document creation will be described below in reference to FIG. 3. Another exemplary method 500 will be described below for labeling media objects during document creation in reference to FIG. 5. In yet another embodiment of the present invention, methods 300 and 500 are combined and the strings and media objects in the electronic document being created are recognized and semantically labeled as part of the same process. As one of ordinary skill in the art will understand, the present invention may be implemented so as to recognize and semantically label any one or more of the multitude of different data types that may be contained in an electronic document.

Method for Semantically Labeling Strings During Document Creation

Figure 3:
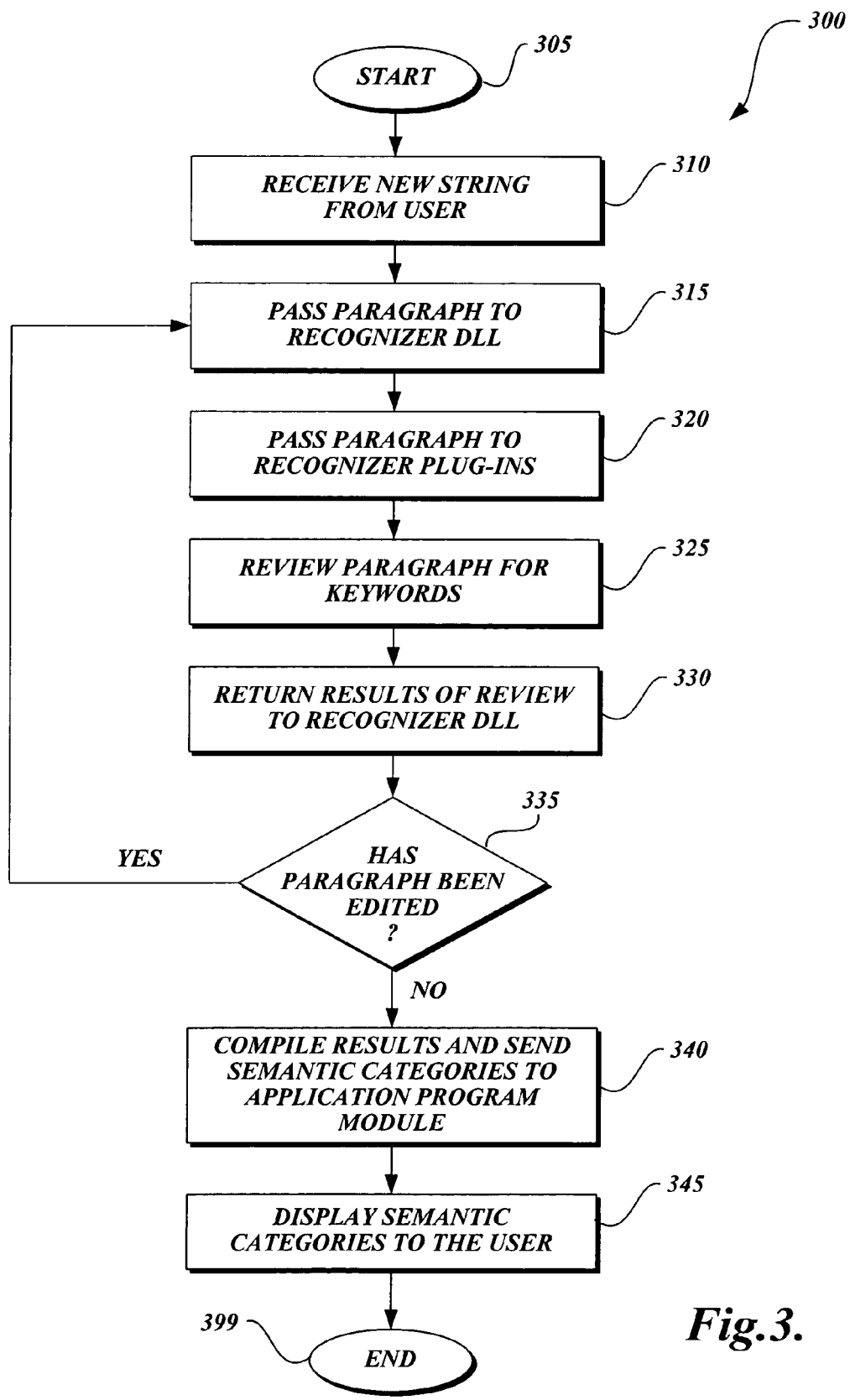
FIG. 3 is a flow chart illustrating a method for semantically labeling strings during creation of an electronic document in accordance with an exemplary embodiment of the present invention.

FIG. 3 is a flow chart illustrating a method 300 for semantically labeling strings during creation of an electronic document in accordance with an exemplary embodiment of the present invention. Those skilled in the art will appreciate that this exemplary embodiment is a computer-implemented process that is carried out by the computer in response to input from the user and instructions provided by a program module.

Referring to FIG. 3, the method 300 begins at start step 305 and proceeds to step 310 when a user opens an electronic document in application program module 205. In a preferred embodiment, the electronic document is a word processing document or a spreadsheet document. However, the invention is not limited to either of these specific types of electronic document.

At step 310, the application program module 205 receives a new string, such as when the user enters a new paragraph into the electronic document or edits a previously entered paragraph. The method 300 then proceeds to step 315.

At step 315, the paragraph containing the new string is passed from the application program module 205 to the recognizer DLL 210. The recognizer DLL is responsible for communicating with the application program module, managing the jobs that need to be performed by the recognizer plug-ins, receiving results from the recognizer plug-ins, and sending semantic category information to the application program module. At boot time, the recognizer DLL communicates with its recognizer plug-ins to determine what languages it supports, what types it can apply, etc. It should be understood that, in a preferred embodiment, a paragraph is passed to the recognizer DLL at step 315. However, in alternative embodiments, a sentence, the contents of a spreadsheet cell, a section of the document, the entire document, etc., may be passed to the recognizer DLL. In other words, the present invention is not limited to simply passing a paragraph to the recognizer DLL. The method 300 then proceeds to step 320.

Still referring to step 315, the application program module 205 typically sends one paragraph at a time to the recognizer DLL. In addition, in a preferred embodiment, a grammar checker program module sends all semantic categories (without type labels) to the recognizer DLL that have been identified by the grammar checker program module. Passing these semantic categories (without type labels) to the recognizer DLL is important because doing so saves each recognizer plug-in from needing to decide whether something is a capitalized string interspersed with function words (a task that would require writing a number of regular expressions: Cap Cap Unc Cap; Cap Unc Cap; etc.). If a label is applied by a recognizer plug-in to a string the grammar checker program module labeled, the grammar checker label will then be removed.

At step 320, during idle time, the paragraph (and information from the grammar checker program module) is passed to the recognizer plug-ins. The method then proceeds to step 325.

It should be understood that, in a preferred embodiment, the recognizer DLL 210 maintains a job queue. If before the recognizer DLL 210 sends the paragraph to the recognizer plug-ins 220 the user edits the paragraph, then the job containing the edited paragraph is deleted and is not sent to the recognizer plug-ins. Then, a new job enters the queue at step 315 after the edited paragraph is received at step 310. This job deletion is necessary to prevent the recognizer plug-ins from performing unnecessary work on a paragraph that has been edited.

At step 325, the recognizer plug-ins are executed on the paragraph to recognize keywords or perform other actions defined by the recognizer plug-in. As part of executing the recognizer plug-in, the paragraph may be broken into sentences by the recognizer plug-in. However, each recognizer plug-in is responsible for its own sentence-breaking. After the keywords are found at step 325, then the method proceeds to step 330.

At step 330, the results from each of the recognizer plug-ins are received by the recognizer DLL. The method then proceeds to decision step 335.

At decision step 335, it is determined whether the paragraph that has been reviewed by the recognizer plug-ins has been edited after the paragraph was sent to the recognizer DLL. If so, then the method 300 returns to step 315 and the edited paragraph is received by the recognizer DLL from the application program module. If not, then the method proceeds to step 340.

At step 340, the results from the recognizer plug-ins are compiled into semantic categories by the recognizer DLL and the semantic categories are sent to the application program module. At step 345, the application program module displays the semantic categories to the user in the electronic document. The method 300 then ends at step 399.

As understood from the above description, the present invention comprises an architecture for recognizing semantic categories that permits third parties to develop recognizer plug-ins to identify strings of one or more particular types. The recognizer plug-ins communicate with the application program module and receive a string from the application program module. The recognizer plug-ins may apply recognition algorithms to the string and communicate the identity of recognized strings back to the application program module.

After a string is labeled with a particular type label, the user will be able to execute action plug-ins that pertain to that type label. The action plug-ins preferably are COM objects that are executed via communication between the application program module and the action DLL. Parameters necessary to execute the action (the html of the string labeled as being of a particular type, the html of the string representing the current selection) will be passed from the application program module to the action DLL and, in turn, passed to the action plug-in.

Method for Semantically Labeling Media Objects During Document Creation

Figure 5:
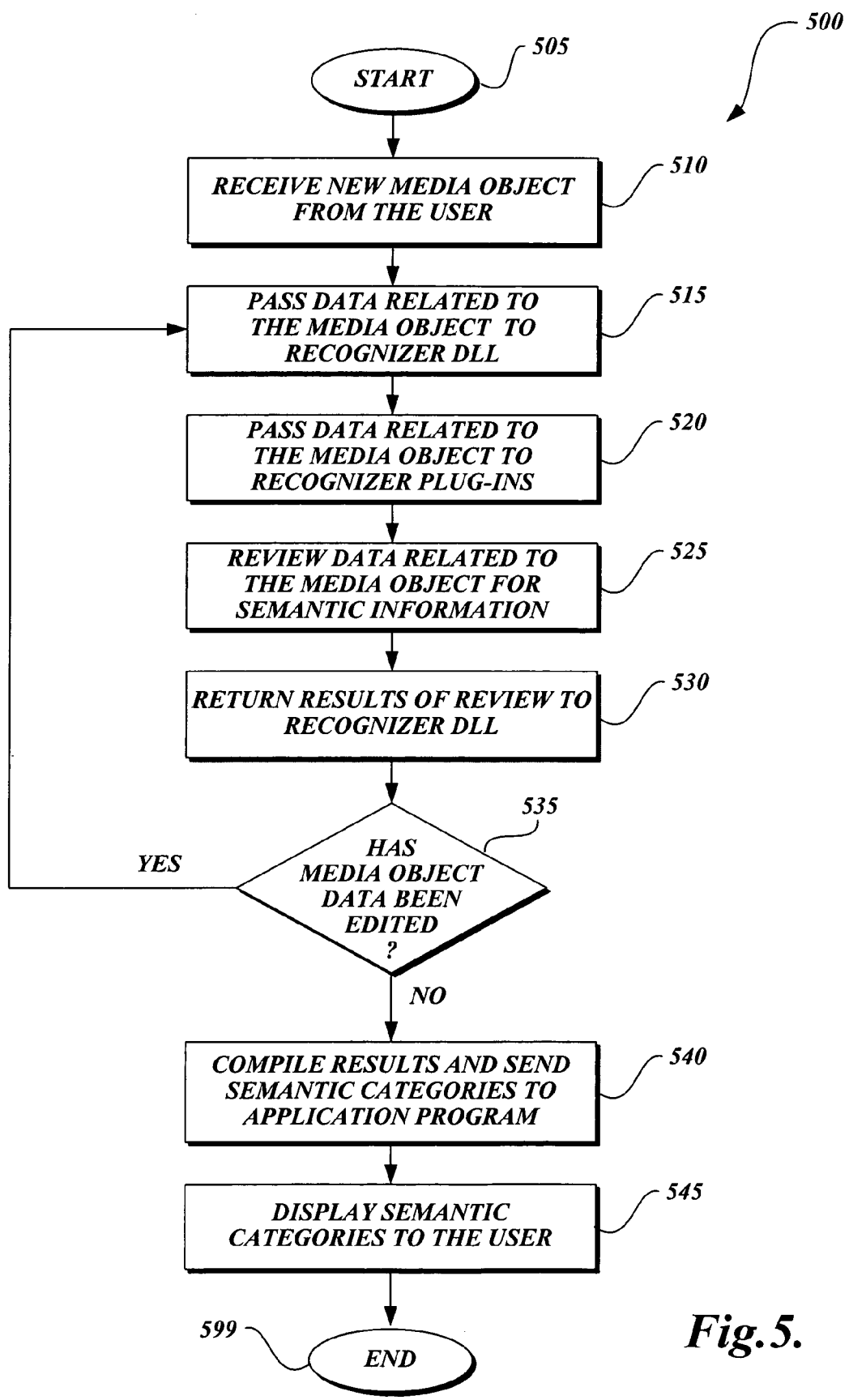
FIG. 5 is a flowchart illustrating a method for semantically labeling media objects during creation of an electronic document in accordance with an exemplary embodiment of the present invention.

FIG. 5 is a flowchart illustrating the method 500 for semantically labeling media objects during creation of an electronic document in accordance with an exemplary embodiment of the present invention. Those skilled in the art will appreciate that this exemplary embodiment is a computer-implemented process that is carried out by the computer in response to input from the user and instructions provided by a program module.

Referring to FIG. 5, the method 500 begins at start step 505 and proceeds to step 510 when the user opens an electronic document in application program module 205. In one embodiment, the electronic document is a word processing document or a spreadsheet document. In other embodiments of the present invention, the electronic document may be implemented in other application program modules, including but not limited to HTML authoring programs and programs such as the "POWERPOINT"® presentation graphics program and the "OFFICE" program module, both marketed by Microsoft Corporation of Redmond, Wash. In yet other embodiments, the electronic document may be implemented in application program modules that perform handwriting recognition and speech recognition.

At step 510, the application program module 205 receives the new media object, such as when the user inserts a new media object into the electronic document or modifies a previously inserted media object. The method 500 then proceeds to step 515.

At step 515, an amount of data in the electronic document is passed from the application program module 205 to the recognizer DLL 210. The data passed from the application program module 205 to the recognizer DLL 210 includes data related to the media object in the electronic document, such as the media object itself, a pointer to the media object, and metadata about the media object, such as a set of properties for the media object. In one embodiment of the present invention, a paragraph including data related to the media object is passed to the recognizer DLL 210 at step 515. In alternative embodiments, the contents of a spreadsheet cell, a slide of a presentation graphics program, a pointer to an embedded media object, the contents of a handwritten ink object, the contents of an HTML page, or the entire content of the electronic document, etc., may be passed to the recognizer DLL 210. Those skilled in the relevant art will realize that the present invention may be practiced by passing any desired amount of data in the electronic document to the recognizer DLL 210.

The recognizer DLL 210 performs similarly with respect to method 500 as was described above in reference to method 300. That is, the recognizer DLL 210 communicates with the application program module 205, manages the jobs that need to be performed by the recognizer plug-ins 220, receives results from the recognizer plug-ins 220, and sends semantic category information to the application program module 205. At boot time, the recognizer DLL 210 communicates with its recognizer plug-ins 220 to determine what types of media objects it supports, what type labels it can apply, etc. The method 500 then proceeds to step 520.

At step 520, during idle time, an amount of data in the electronic document data is passed to the recognizer plug-ins. The data passed to the recognizer plug-ins 220 includes data related to the media object, such as the media object itself, a pointer to the media object, and metadata about the media object, such as a set of properties for the media object. Any amount of data may be passed to the recognizer plug-ins 220. In one embodiment, a paragraph that includes a media object may be passed to the recognizer plug-ins 220. When a paragraph including text and a media object is passed to the recognizer DLL 210, the recognizer plug-ins 220 will recognize the media object data in the text string of the paragraph. In another embodiment, only data related to the media object is passed to the recognizer plug-ins 220.

In one embodiment of the present invention, the recognizer DLL 210 maintains a job queue. If, before the recognizer DLL 210 sends the data to the recognizer plug-ins 220, the user edits the media object data sent to the recognizer DLL 210, then the job containing the edited media object data is deleted and is not sent to the recognizer plug-ins. A new job enters the queue at step 515 after the edited media object data is received at step 510. The job deletion is to prevent the recognizer plug-ins 220 from performing unnecessary work on media object data that has been edited. The method 500 then proceeds to step 525.

At step 525, the recognizer plug-ins 220 are executed on the data passed from the recognizer DLL 210 to recognize semantic information or perform other actions defined by the recognizer plug-ins 220. The recognizer plug-ins 220 review the media object data passed from the recognizer DLL 210 for semantic information. In one embodiment, the recognizer plug-ins 220 review the content of a media object for semantic information. For example, a recognizer plug-in may use image processing to recognize an image of a person and may label the image media object as a person image type. As another example, the recognizer plug-in may review the data stream contents of the media object file for semantic information.

As one of ordinary skill in the art will readily understand and appreciate, the present invention includes recognizer components, such as recognizer dynamic link libraries and recognizer plug-ins, that are operative to perform any conventional computer software technology. In one embodiment of the present invention, the recognizer components communicate with other computer applications. For example, in one embodiment, the recognizer plug-in calls another image processing software application. The image processing software application called by the recognizer plug-in can reside on a local computer or on a remote computer connected via a cable or communications link. The present invention is not limited to any particular type of recognizer component or recognition processing. The present invention may be practiced utilizing a wide variety of recognizer components that can perform in accordance with conventional software technology. Additionally, the present invention may be practiced utilizing a recognizer component that communicates with one or more other computers and/or computer programs to perform any of the plethora of conventional computer processing functions possible.

In another embodiment, the recognizer plug-ins 220 review metadata about a media object for semantic information. For example, the recognizer plug-in may review metadata about a repository where the media object resides. The recognizer plug-in may perform additional actions to search the repository for additional semantic information, such as an annotation associated with the media object. As another example, a recognizer plug-in 220 may review metadata to recognize when a digital photograph media object was taken. The time a digital photograph is taken is meaningful since there may be related photographs taken on the same day or in the same week. Also, the same recognizer plug-ins 220 that are applied to text strings could also be applied to metadata text strings about a media object.

In yet another embodiment, the recognizer plug-ins 220 recognize semantic information by reviewing a set of properties for the media object, such as properties for the author of the media object, the file creation time for the media object, etc. For example, while creating or editing an electronic document, the user adds a picture media object whose filename is "party17.JPG," which was created on Sep. 1, 1999, using a device called a "Microsoft Camera Model 79," which had additional metadata in a photo editing and storage software application that indicated that the subject was "Mary's birthday party" and the location was "Yakima, Wash." and that this image was part of a photo album called "Birthday pictures." All of this information about the picture media object can be included in properties for the media object and made available to the recognizer components. Those of ordinary skill in the art will understand that there are many ways known in the art for obtaining metadata about media objects, which may be utilized by the recognizer plug-ins 220.

In still yet another embodiment, the recognizer plug-ins 220 receive the media object or a pointer to the media object and recognize semantic information by querying the media object. The recognizer plug-ins 220 query the media object using well-known technologies for transferring and sharing information among applications, such as the Component Object Model ("COM") and Object Linking and Embedding ("OLE") specifications for developing software components that can be assembled into programs or add functionality to existing programs running on Microsoft Windows platforms. Both COM and OLE are marketed by Microsoft Corporation of Redmond, Wash.

In an additional embodiment of the present invention, the recognizer plug-ins 220 are applied to media objects consisting of non-text input, such as handwritten input, speech input, sign language input, East Asian character input, and the like. When non-text input, such as a handwritten image or a speech audio is input into the electronic document, the non-text input may be converted into text using probabilistic input methods known in the art. For example, known probabilistic input methods include handwriting recognition programs, speech recognition programs, sign language recognition programs, and input method editors for entering characters used in East Asian written languages. Probabilistic input methods, such as speech recognition and handwriting recognition, typically involve generating lattices of hypotheses about what a particular input might have actually been. The recognizer plug-ins 220 may be executed during the conversion process, which may aid in the correct conversion of non-text input to text. During the conversion process, the hypotheses with semantic labels may be favored over those without semantic labels. Recognizer plug-ins 220 can be executed on all of the hypotheses or can be executed on the single most probable hypotheses. If the most probable hypothesis is examined, less semantic information will be correctly recognized and labeled. Examining all of the hypotheses will result in more semantic information being correctly recognized and labeled, but at the risk of introducing spurious semantic labels. The recognizer plug-ins 220 may also be executed post-conversion, during the process of providing correction alternatives for the non-text input. Again, the correction alternatives with semantic labels could be favored over those without semantic labels.

In a further embodiment, a recognition program processes the non-text data as it is input into the electronic document. For example, a handwriting recognition program processes the handwriting as it is input into the electronic document. In this embodiment, the recognition program generates a lattice of hypotheses while leaving the input in the original non-text form. For example, a handwriting recognition program generates a lattice of hypotheses while leaving the input in the original image form. The recognizer plug-ins 220 access the lattice of hypotheses and determine the location of semantic information in the non-text input without forcing the user to convert the non-text input to text. Because recognition methods involving utilizing probabilities, recognition is not always accurate. Also, correcting misrecognitions is tedious. For this reason, many users do not convert the non-text input to text. For example, since handwriting recognition is often inaccurate, and cleaning up misrecognitions while taking notes is tedious, many users leave their handwriting input as an image of their writing and do not convert it to text. The advantage of applying semantic labels on the original non-text input, such as handwritten or spoken input, is that actions assigned to the type labels will be available even though the input is in its original non-text form. For instance, someone using a handwriting application is able to retain his handwriting image while using semantic labels to perform assigned actions and work more efficiently.

Once the recognizer plug-ins 220 have reviewed the media object data and recognized the semantic information, the type labels may be applied to the media object. After recognizing the semantic information at step 525, method 500 proceeds to step 530. At step 530, recognizer DLL 210 receives the results from the recognizer plug-ins 220. Method 500 then proceeds to decision step 535.

At decision step 535, the method 500 determines whether the media object data that has been reviewed by the recognizer plug-ins 220 has been modified after the data was sent to the recognizer DLL 210. If so, then method 500 returns to step 515 and the modified media object data is received by the recognizer DLL 210 from the application program module 205. If not, then method 500 proceeds to step 540.

At step 540, the results from the recognizer plug-ins 220 are compiled into semantic categories by the recognizer DLL 210 and these semantic categories are sent to the application program module 205. At step 545, the application program module 205 displays the semantic categories to the user in the electronic document. The method 500 then ends at step 599.

Those skilled in the relevant art will appreciate that the present invention may also be practiced utilizing an application program interface ("API") to pass data to the recognizer DLL 210. In one embodiment, an API queries the media object in the electronic document to obtain a set of properties to pass to the recognizer DLL 210. For example, the set of properties may include the date a media file was created, a media file type, a device model associated with the media object, a subject associated with the media object, a location of the media object, etc. The media object properties are extensible and the user may define additional properties for the media object. In another embodiment, an API extracts metadata from the media object in the electronic document to pass to the recognizer DLL 210.

Additionally, the present invention may also be practiced utilizing a hybrid of the API approach, described above. In one embodiment, an API obtains a metadata schema of properties for commonly known media objects and passes a pointer to media objects that are not commonly used and for which the API is not designed to handle. For example, an API may be designed to handle commonly used media objects such as a graphic image encoded in the Joint Photographic Experts Group file interchange format ("JPEG"), which is commonly used in HTML pages. However, the API may not be designed to handle an equation object created by an equation editor used in a word processing document. The API may still pass a pointer to the equation object to the recognizer DLL 210, and the recognizer DLL 210 may in turn pass the pointer to the equation object to a recognizer plug-in 220 that is developed to recognize semantic information for equation objects.

As should be understood from the above description, the architecture for recognizing semantic categories permits third parties to develop recognizer plug-ins 220 to identify media objects of one or more particular types and to recognize semantic information for that type of media object. After a media object is labeled with a particular type label, the user will be able to execute action plug-ins that pertain to that type label. The action plug-ins preferably are COM objects that are executed via communication between the application program module and the action DLL. Parameters necessary to execute the action (the HTML of the media object labeled as being of a particular type, the HTML of the media object representing the current selection) will be passed from the application program module to the action DLL and, in turn, passed to the application plug-in.

Actions Assigned to Type Labels in a Preferred Embodiment

The present invention further comprises an architecture for identifying and executing a set of actions associated with a semantic category. This architecture comprises actions that apply to a particular type label (e.g., an action for book titles may be "Buy this book from shop.Microsoft.com") and executing those actions when the user so desires. An action is a user-initiated function applied to data such as a typed string or an embedded media object. For example, adding a name to the contacts folder is one action possible for a type label "Person name." As another example, e-mailing a link to this photograph to a friend is one possible action for a type label "Photograph."

It should be understood that a significant aspect of the present invention is the power and flexibility that results from allowing third-party vendors, such as IT professionals, to design and write recognizer plug-ins and action plug-ins for deployment within an organization or for deployment on the World Wide Web. Some example actions that may be executed include:

Schedule a meeting
Create task
Display calendar
Add to contacts folder
Look up in contacts folder, address book, Windows Address Book (WAB), Global Address List (GAL), etc.
Insert address into document
Send mail to
Display EXPEDIA map
Stock quote lookup
Send instant message to
Insert photograph of person
Show photographs taken same day
Show photographs with similar descriptions
E-mail a link to this photograph to a friend
Create a playlist of songs by this artist
Show songs liked by people who liked this song In a preferred embodiment, different actions are assigned to different type labels and these type label-action assignments are stored in the type-action database 230. Table 1 below illustrates some possible type label-action pairings.

TABLE 1

| Type Labels | Actions |
| --- | --- |
| Person name | Show contact info |
| | Add to contacts |
| | E-mail |
| | Insert address into document |
| | Send instant message to |
| | Insert image of person |
| Date | Show calendar for that day |
| | New task with that due date |
| | Schedule meeting that day |
| Place | Display EXPEDIA map |
| | Add to contacts |
| Address | Add to contacts |
| Phone number | Add to contacts |
| E-mail | Add to contacts |
| Date | Schedule a meeting |
| Type Labels | Actions |
| Task | Schedule a task |
| Meeting | Schedule a meeting |
| Person photograph | Insert other pictures of person |
| | Browse other pictures of person |
| | E-mail link to photograph to person |
| Song MP3 | Create playlist of songs by this artist |
| Song Media Player | Show music liked by people who like this song |
| Clip art image | Insert other clip art in same category |
| | Browse other clip art in same category |
| | Show clip art created by same artist |
| Video image | Insert other video clips taken same day |
| | Insert videos with similar descriptions |
| | E-mail a link to this video |

TABLE 1-continued

| Type Labels | Actions |
| --- | --- |
| Photograph image | Insert other photographs taken same day<br>Insert photographs with similar descriptions<br>E-mail a link to this photograph |

For each type label, the type-action database 230 will store a download URL specified by the creator of the type label that users who do not have action-plug-ins or recognizer plug-ins for that semantic category type can go to in order to get action plug-ins and/or recognizer plug-ins. For example, the download URL for the type label "Book Title" might be microsoft-.com/semanticcategories.asp. Once at that web page, a user may be offered downloads of various action plug-ins and recognizer plug-ins. There may also be an option on the user interface to navigate to the download URL so that recipients of documents with semantic categories can easily get the action plug-ins for those semantic categories.

Storing Semantic Categories

In a preferred embodiment, semantic categories are stored as part of the electronic document along with other document information and are available when a document is transmitted from one computer to another computer. In a preferred embodiment, storing semantic categories in an electronic document is controlled by an "Embed semantic categories" checkbox. The checkbox is on by default. Turning it off will prevent semantic categories in the document from being saved. The state of the checkbox is per document. The same checkbox controls saving for both .htm and .doc documents.

Checking a "Save semantic categories as XML properties" checkbox (off by default) will write out the text of all of the semantic categories in the document and their labels in the header of the html file in XML (that is using the same tags as are used inline, but surrounded by <xml> And </xml>) for easy identification and parsing by search engines and knowledge management systems.

In a preferred embodiment, semantic categories are saved as a unique namespace plus a tag name. A namespace is an XML construct for uniquely identifying a group of XML tags that belong to a logical category. Thus, every semantic category is uniquely identified by its nametag (e.g., "streetname") in addition to its namespace (e.g., "schemas-microsoft-com:outlook:contact").

Although method 300 and method 500 described above are two methods for identifying semantic categories, in a preferred embodiment of the present invention, there are other mechanisms for identifying semantic categories as well. One mechanism is a grammar checker program module (not shown) connected to word processor program module 37. Another mechanism is receiving a semantic category from another electronic document. For example, when data containing a semantic category is copied from one electronic document and pasted into another electronic document of the word processor program module 37, the information identifying the semantic category is preserved and copied along with the copied data. Yet another mechanism may be utilized when importing a media object into an electronic document, where the act of importing the media object includes identifying semantic information and inserting the semantic information and a label to indicate a semantic category for the imported media object. These additional mechanisms are described in detail below.

Using a Grammar Checker Program Module to Identify Semantic Categories

In a preferred embodiment of the present invention, a grammar checker program module may be used to identify semantic categories of the following types:
Person names (Example: Bill Smith)
Complete dates (Example: May 1, 1999)
Partial dates (Examples: May 1999; May 1)
A limited subset of temporal expressions (Examples: today, tomorrow, next Tuesday)
Times (Examples: 4:00 PM; 17:30)
Addresses (Example: 1053 Church Street Abington, Pa. 19001)
Places (Example: Trafalger Square)
Cities (Example: Pittsburgh)
Phone Numbers (Example: 215-887-9093)
E-mail addresses (Example: bob@xyz.com)
Web addresses In a preferred embodiment, the grammar checker program module will sometimes send a normalized form of the string to the word processor program module along with the other semantic category information. For example, for the strings May 11, 1999 and May 11, 1999 the grammar checker program module sends the normalized form "May 11, 1999" to the word processor program module. The word processor program module stores this normalized form of the string to make it easier to query a personal information manager program module, web properties, and other program modules. For example, the grammar checker program module may return normalized forms for the following strings:
Dates (Example: "today" normalized to "Oct. 15, 1999")
Times (Examples: "4 pm" normalized to "4:00 pm")
Telephone numbers (to normalize for variants involving parentheses and hyphens)

It should be understood that the normalized forms for dates and times will typically be determined at write time of a document rather than read time.

Identifying Semantic Categories via Cut and Paste

In a preferred embodiment, copying or cutting a semantic category from one application program module and pasting the semantic category into a second application program module that recognizes semantic categories will preserve the semantic category. In other words, copying and pasting (or dragging and dropping) a string or media object labeled with semantic category information will copy the string or media object and the string's or media object's semantic category information. Moreover, it follows that complete documents sent from one application program module (or computer) to another application program module (or computer) will also typically preserve the semantic categories.

In a preferred embodiment, semantic categories are placed in the clipboard in CF_HTML. CF_HTML, or clipboard format HTML, is essentially HTML with some clipboard specific properties such as the length of the HTML string. However, application program modules that do not recognize semantic categories may make a special effort to persist pasted semantic categories. For example, pasted semantic categories may be preserved as unknown HTML. semantic categories Identifying Semantic Categories via Importing Media Objects In an embodiment of the present invention, the act of importing a media object into an electronic document includes importing semantic information from the repository where the media object resides and applying a semantic category label to the imported media object. In one embodiment, the semantic information is obtained and identified by the application program module that manages the repository where the media object being imported resides, such as a clip art database or a photo album database. In this embodiment, the application program module managing the repository inserts semantic information and a semantic category label into the electronic document. In another embodiment, the application program module 205 used for creating the electronic document obtains and identifies semantic information. In this embodiment, the application program module 205 inserts the semantic information and a semantic category into the electronic document label. For example, a semantic category may be associated with metadata from the repository where the imported media object resides, such as the date the media object was created and the media object's author. Additionally, the application program module may also identify semantic information and apply semantic category labels to embedded media objects at other times as well. For example, when a word processing document is saved as an HTML page, the application program module can save the embedded media objects with extensible markup language ("XML") inserted around the embedded media object to indicate a semantic category. Once an embedded media object has been labeled with a semantic category, the user can be offered all of the actions that are assigned to that with the semantic type label stored in the type action database 230.

Displaying Semantic Categories to the User

The present invention semantically labels data, such as text strings and media objects, as it is entered into an electronic document. The electronic document data displays semantic categories for all of the data recognized, including text strings and media objects, such as images, photographs, video clips, clip art, etc. Illustrations of displays of semantically labeled strings will be described below in reference to FIGS. 4A-4C. Illustrations of displays of semantic categories for media objects will be described below in reference to FIGS. 6A and 6B.

Figure 4A:
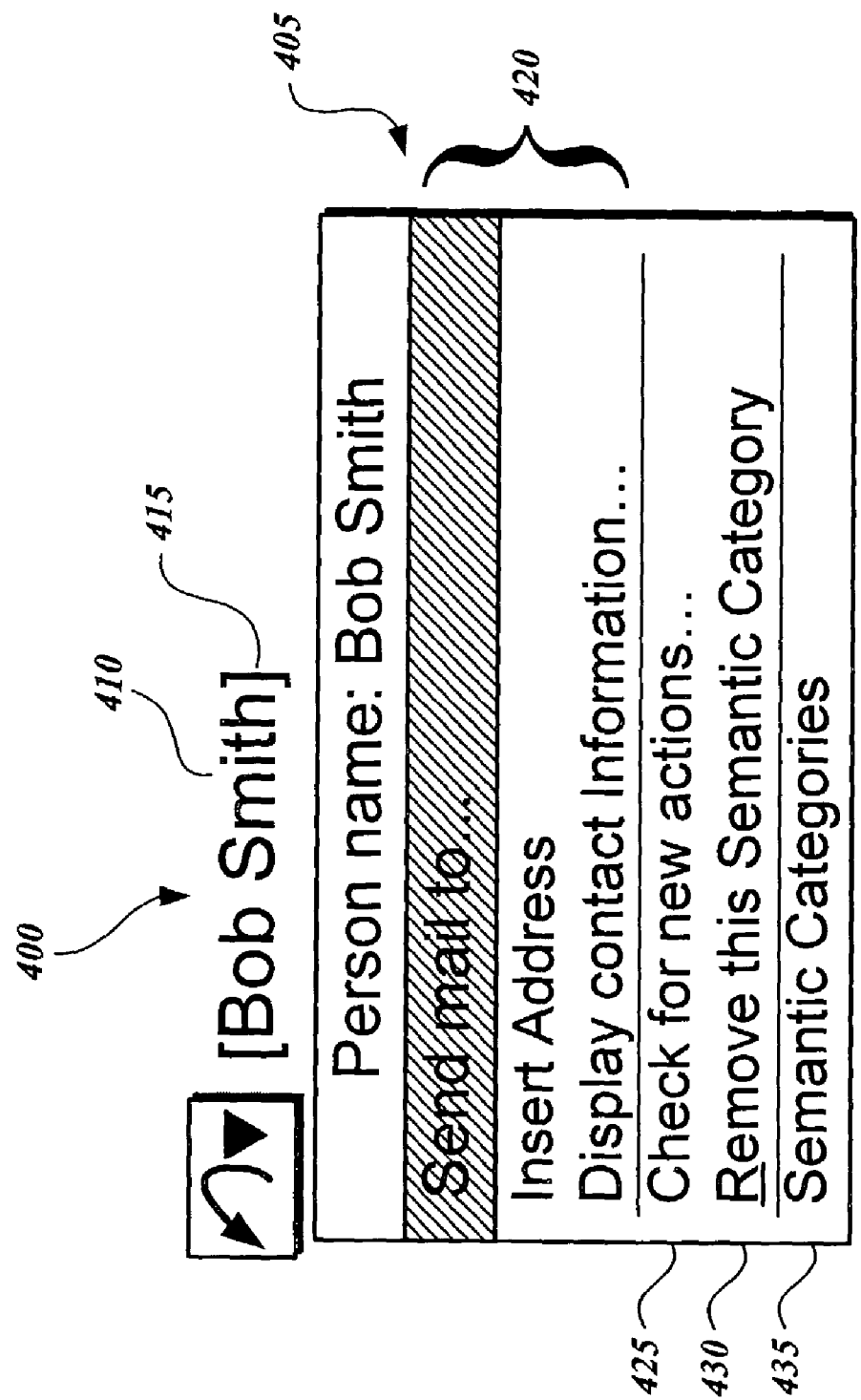
FIG. 4A is an illustration of a display of a preferred embodiment of a semantic category and its associated drop-down menu.

Referring now to FIG. 4A, an illustration of a display of a preferred embodiment of a semantic category 400 and its associated dropdown menu 405 will be described. It should be understood that FIG. 4A is an illustration of a semantic category 400 and dropdown menu 405 as displayed to a user by the application program module 205.

The string 410 associated with semantic category 400 is the string "Bob Smith." As shown in FIG. 4A, the string 410 of a semantic category 400 may be identified to the user by brackets 415. Of course, many other devices such as coloring, underlining, icons, etc., may be used to indicate to the user that a particular string is a semantic category.

In a preferred embodiment, when the user hovers a cursor over the string 410 or places the insertion point within string 410, then drop down menu 405 is displayed to the user. The dropdown menu typically displays a list of actions associated with a semantic category. The drop down menu typically appears above and to the left of the semantic category string.

Typically, the first line of the drop down menu indicates which string is the semantic category string (Bob Smith in FIG. 4A) and what type the semantic category is (Person name in FIG. 4A). Listed below the first line are actions 420 available for the semantic category type, such as "Send mail to . . . ," "Insert Address," and "Display contact information . . . ."

The first item on the drop down menu below the separator line is "Check for new actions . . . " 425. "Check for new actions . . . " 425 will appear only for semantic categories whose download URL is available to the application program module. If selected, "Check for new actions . . . " 425 uses the semantic category download URL to navigate the user's web browser to the homepage for the semantic category type applied to the string. For example, suppose new actions have been defined for the semantic category type "person name." If so, then new actions will be downloaded to the user's computer after selecting "Check for new actions . . . " 425. "Check for new actions . . . " 425 will be grayed out if a download URL is unavailable for the semantic category.

If selected, the "Remove this semantic category" item 430 deletes the semantic category label from the string. If selected, the "Semantic categories" item 435 navigates the user to the semantic categories tab of the autocorrect dialog.

It should be understood that the application program module 205 sends a request to the action DLL to determine which actions are shown with each semantic category type.

Figure 6A:
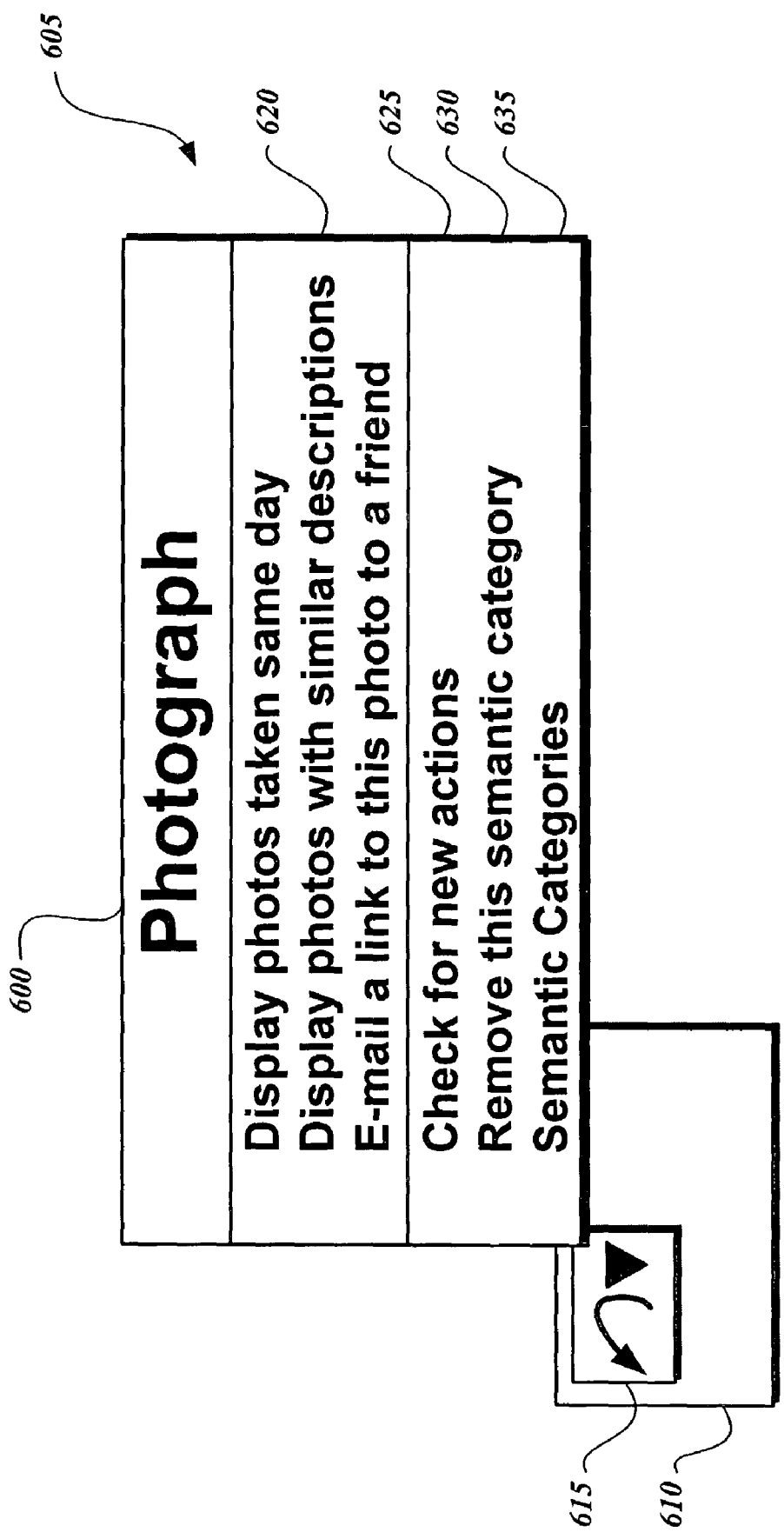
FIGS. 6A and 6B are illustrations of a display of a preferred embodiment of a semantic category and its associated drop-down menu.

Turning now to FIG. 6A, an illustration of a display of a semantic category 600 and its associated drop down menu 605 will be described. FIG. 6A illustrates a semantic category 600 and drop down menu 605 as displayed to a user by the application program module 205. The media object 610 associated with semantic category 600 is a photograph media object embedded in the electronic document. As shown in FIG. 6A, the photograph media object 610 is associated with a semantic category 600, which is indicated to the user by icon 615. Of course, many other devices such as coloring, highlighting, and the like, may be used to indicate to the user that a particular embedded media object is associated with a semantic category.

In a preferred embodiment, when the user hovers a cursor over the embedded media object 610, then the drop down menu 605 is displayed to the user. The drop down menu 605 typically displays a list of actions associated with a semantic category. Typically, the first line of the drop down menu 605 indicates the type of the semantic category, such as a photograph as shown in FIG. 6A. Listed below the first line are actions 620 available for the semantic category type, such as "display photographs taken on the same day," "display photographs with similar descriptions," and "e-mail a link to this photograph to a friend."

The first item on the drop down menu below the separator line is "check for new actions" 625. "Check for new actions" 625 will appear only for semantic categories whose download URL is available to the application program module 205. If selected, "check for new actions" 625 uses the semantic category download URL to navigate the user's Web browser to the home page for the semantic category type applied to the embedded media object. For example, suppose new actions have been identified for the semantic category type "photograph." If so, then new actions will be downloaded to the user's computer after selecting "check for new actions" 625. "Check for new actions" 625 will be grayed out if a download URL is unavailable for the semantic category.

If selected, the "remove this semantic category" item 630 deletes the semantic category label from the embedded media object. If selected, the "semantic category's" item 635 navigates the user to the semantic category's tab of the autocorrect dialog. It should be understood that the application program module 205 sends a request to the action DLL 215 to determine which actions are shown with each semantic category type.

Figure 6B:
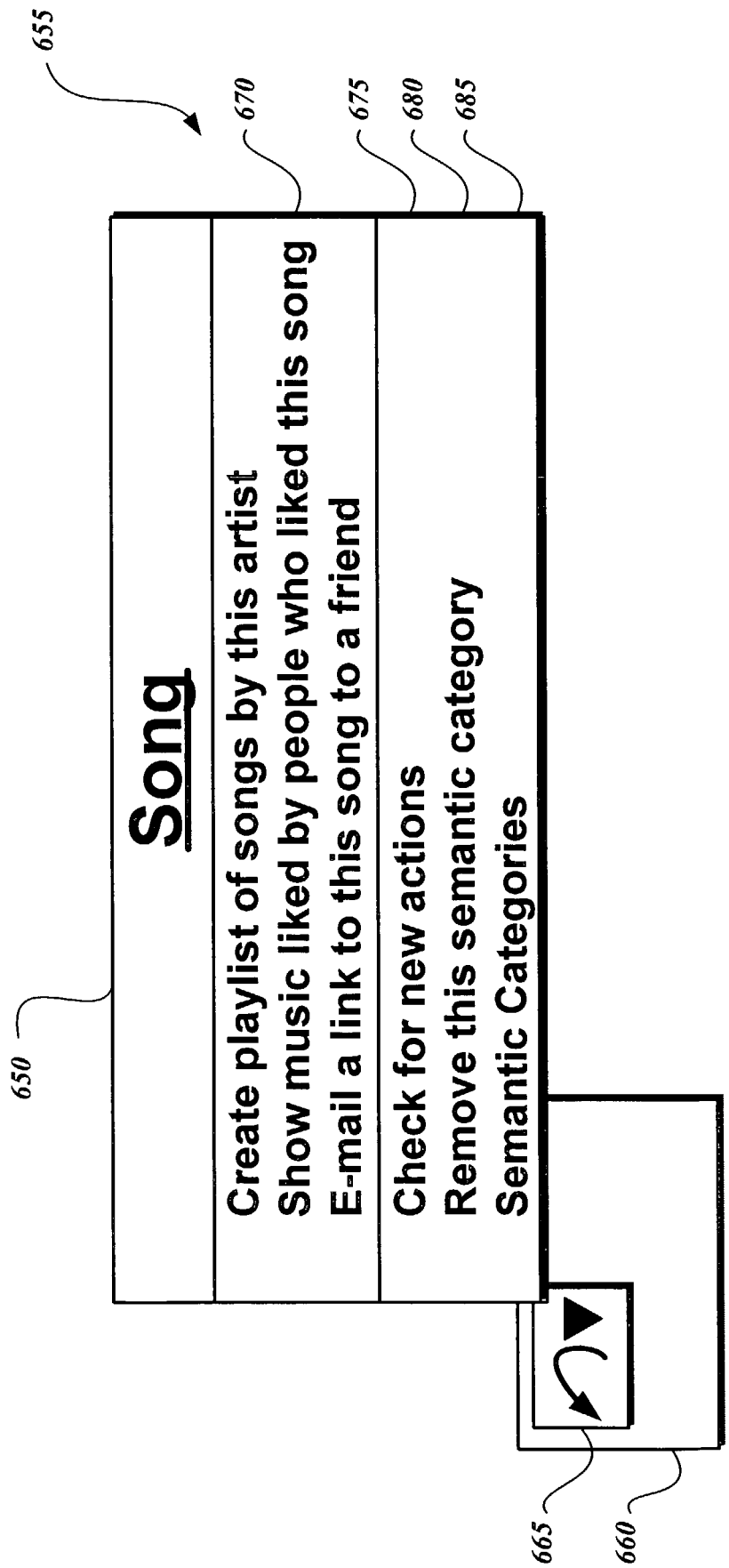

Referring now to FIG. 6B, another illustration of a display of a semantic category 650 and its associated drop down menu 655 will be described. FIG. 6B illustrates a semantic category 650 and drop down menu 655 as displayed to the user by the application program module 205. The embedded audio media object 660 associated with semantic category

650 is an audio media object embedded in the electronic document. As shown in FIG. 7, the embedded audio media object 660 of a semantic category 650 may be identified to the user by icon 665. Of course, many other devices such as highlighting, coloring, and the like may be used to indicate to the user that a particular embedded media object is associated with a semantic category.

In a preferred embodiment, when the user hovers a cursor over the embedded audio media object 660, the drop down menu 655 is displayed to the user. Typically, the first line of the drop down menu indicates the type of the semantic category, such as a song as in FIG. 6B. Listed below the first line are actions 670 available for the semantic category type, such as "create playlist of songs by this artist," "show music liked by people who like this song," or "e-mail a link to this song to a friend." The items below the separator line such as "check for new actions" 675, and "remove this semantic category" 680, and "semantic category's" item 685 function in the same manner as was described above with reference to FIG. 6A.

Actions Performed in Association with Semantic Categories

There are a number of functions that users perform on data that preferred word processor program module 37 and semantic categories will make easier. The functions fall into two primary categories:

1) interacting with personal information manager contacts, tasks, meetings, and mail;
2) interacting with properties on the World Wide Web or a corporate intranet.

A single string or embedded media object may be associated with multiple semantic categories. Every semantic category has a type label with one or more action plug-ins defined for the type label. For example, the "Address" type label may have the "Open in Mappoint," "Find with Expedia Maps," and "Add to my Address Book" actions associated with it and each of these actions may have a different action plug-in to execute the action.

The actions assigned to a semantic category are assigned on a per type label basis, not on a per semantic category basis. For example, all semantic categories of type label "Address" will have the same actions assigned to them. The actions assigned to type labels also depends on the computer that the application program module is running on. Thus, if a computer has three actions registered for the type label "Address," then all strings with an "Address" type label will be assigned to three actions. However, if one of these semantic categories is sent to a computer which has only two actions registered for the "Address" type label, then the user will only be exposed to two actions for this semantic category.

Nesting of Semantic Categories

In an embodiment of the present invention, semantic categories may be nested inside each other. While the following illustrations and description of the illustrations discuss an embodiment of the present invention directed towards semantically labeling and providing actions for a string, those of ordinary skill in the art will understand that the same process may be applied to embedded media objects as well. The present invention includes nesting of semantic categories for all semantically labeled data in the electronic document, including embedded media objects, such as images, photographs, video clips, clip art, handwritten ink objects, and the like. For example, the string "George Washington" may include a semantic category with type label "Person Name" for the span "George Washington State" and a semantic category with type label "State" for the span "Washington." Moreover, two semantic categories may cover exactly the same span. For example, the string "George Washington" may include a semantic category with type label "Person Name" and a semantic category with type label "President."

Figure 4B:
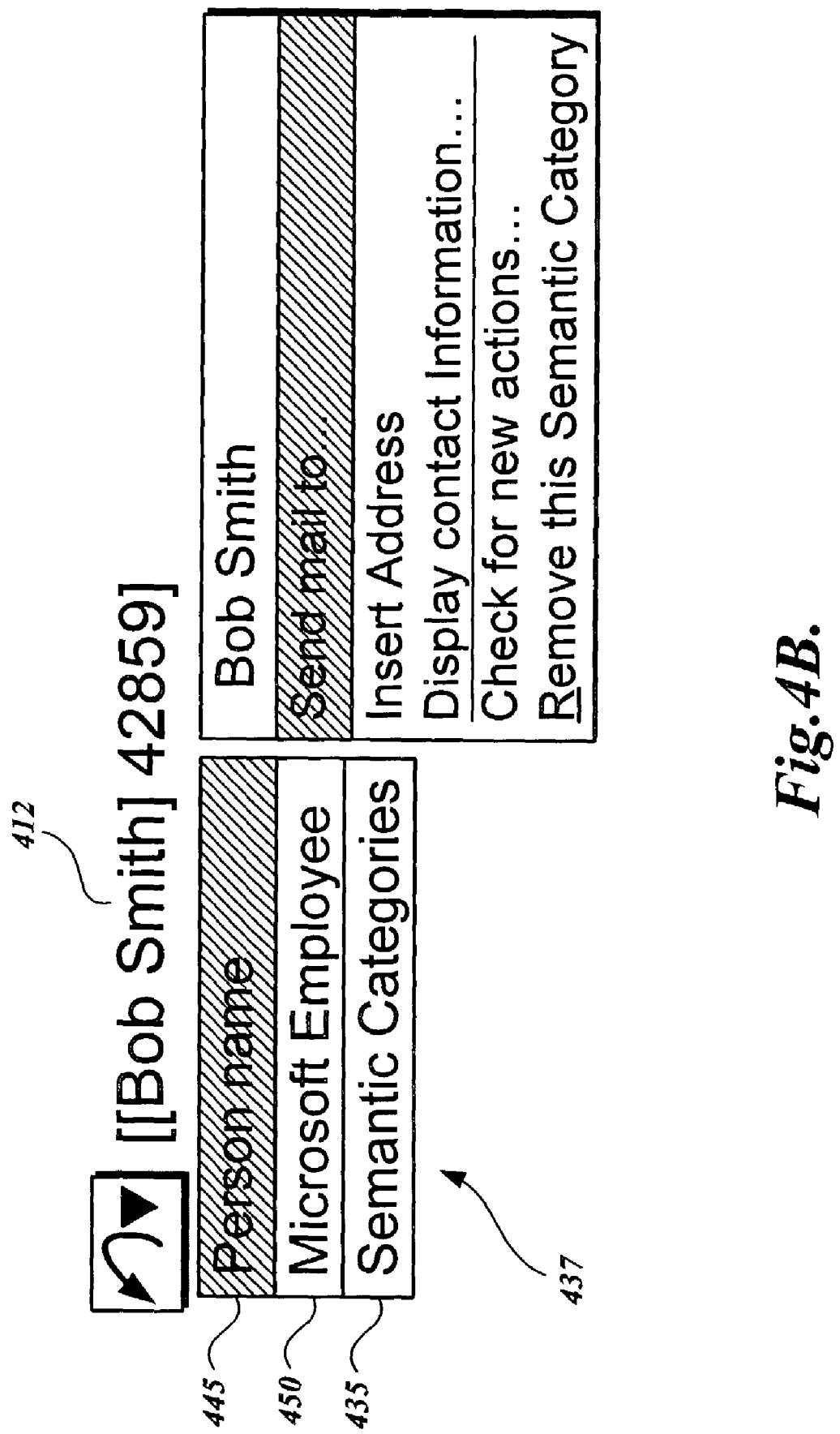
FIGS. 4B and 4C are illustrations of a display of a preferred embodiment of a semantic category and its associated cascade menu.
Figure 4C:
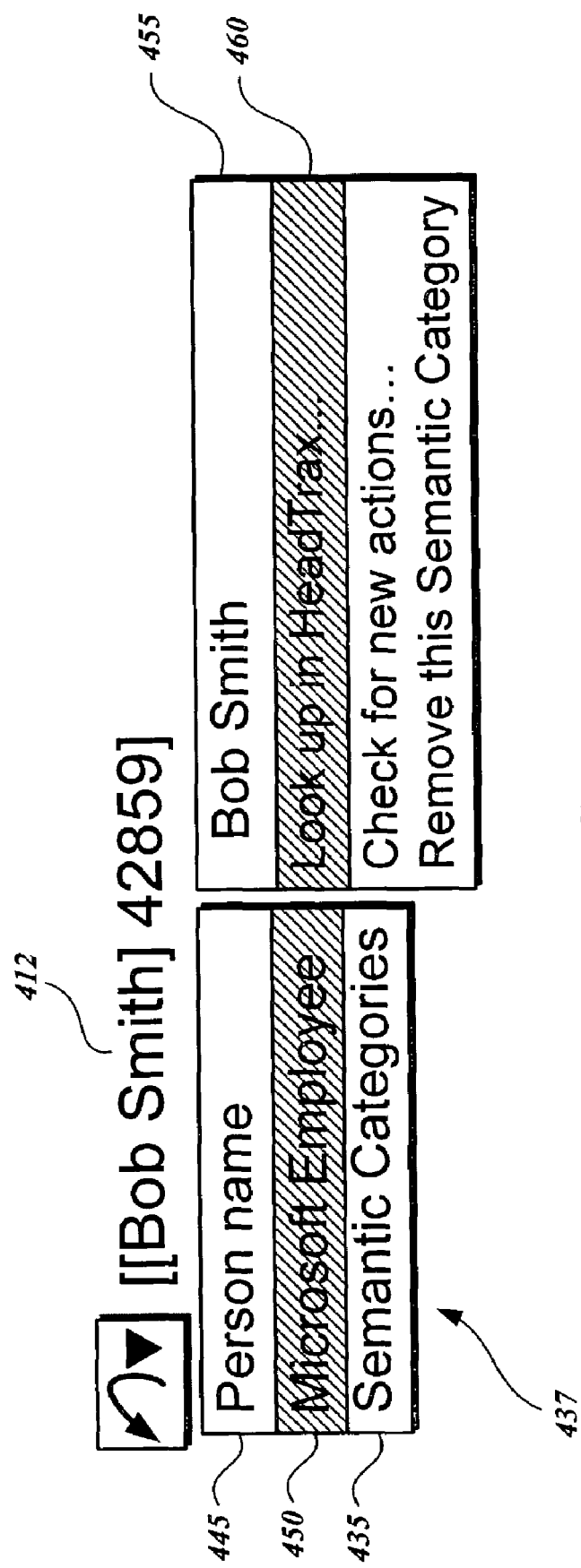

Because the preferred application program module 37 will support labeling a single string with multiple type labels (e.g., Bob Smith could be a semantic category labeled as a "Person Name" and labeled as a "Microsoft employee"), the preferred application program module 37 will use cascade menus on the drop down menu if multiple semantic category types are assigned. Referring now to FIGS. 4B and 4C, cascade menu 437 is illustrated.

The cascade menu 437 includes a list of the type labels included in string 412. This list includes a type label "Person Name" 445 and a type label "Microsoft employee" 450. The cascade menu further comprises the "Semantic categories . . . " item 435.

As illustrated in FIG. 4B, by selecting the type label "Person Name" 445, the user is presented with the actions associated with the type label "Person Name." These actions are similar to those described above with regard to FIG. 4A.

As illustrated in FIG. 4C, by selecting the type label "Microsoft employee" 450, the user is presented with the actions associated with the type label "Microsoft employee." These actions are associated with the string "Bob Smith 42859" 455, whereas the actions illustrated in FIG. 4B are associated with the string "Bob Smith." The only action shown in FIG. 4C is the action 460 to "Look up in HeadTrax . . . "

It should be understood that FIGS. 4B-4C illustrate how a cascade menu may be used to allow the user to select which type label the user is interested in and to further select an action after selecting the type label.

In-document User Interface to Indicate Semantic Categories

As described above with reference to FIGS. 4A-4C, in a preferred embodiment, the application program module includes the option to display an in-document user interface to indicate the location of semantic categories. This in-document user interface may use a colored indication to indicate the location of a semantic category, such as the brackets 415 in FIGS. 4A-4C. The in-document user interface may also use an icon, such as icons 615 and 665 shown in FIGS. 6A and 6B, to indicate the location of a semantic category for an embedded media object. The in-document user interface may also use highlighting and coloration to indicate the location of a semantic category for embedded media objects. Other indicators known in the art may also be utilized, and the present invention is not limited to utilizing any particular indicator for identifying the location of a semantic category in an electronic document. The in-document user interface will also be able to show nesting of semantic categories. For example, if Michael Jordan is labeled as a semantic category with type label "Person Name," Michael is a semantic category with type label "First Name" and Jordan is a semantic category with type label "Last Name," the document may look like this with the brackets indicating semantic categories:

[[Michael][Jordan]]

Of course, the in-document user interface may be any sort of indication. For example, in the "EXCEL" spreadsheet application program, the interface comprises a triangle in the lower right-hand portion of a cell to indicate that one or more semantic categories are present in the cell.

Invalidating the Semantic Categories of a Paragraph of Data

Whenever the user edits a paragraph of text or a cell value in a document of the application program module, that text is flagged as dirty and the recognizer plug-ins and the grammar checker program module (if used) will need to be consulted again to identify semantic categories. The concept of dirtying text is well known in the art.

In a preferred embodiment, only semantic categories recognized by the grammar checker program module are discarded when a paragraph of text is dirtied. That is, the application program module retains semantic categories identified by recognizer plug-ins as well as those pasted into the document even though the text has been dirtied.

When the user edits an embedded media object in an electronic document of the application program module 205, that embedded media object is flagged as dirty and the recognizer plug-ins will need to be consulted again to identify the semantic categories. The concept of dirtying embedded media objects is well known in the art.

Turning off Annotation/Managing Recognizer Plug-ins

As discussed above, the present invention encompasses a method and system for semantically labeling data and providing actions based on semantically labeled data. The present invention includes embodiments for labeling text strings as well as media objects in electronic documents. The discussion below of turning off annotations/managing recognizer plug-ins is described for an embodiment for labeling strings. However, those of ordinary skill in the art will understand that this described method of turning off recognizer plug-ins applies to media objects in electronic documents as well. This present invention is not limited to turning off recognizer plug-ins for text strings, and the same process applies to media objects. In a preferred embodiment, there is a check box in the application program module 37 that turns off all annotation of semantic categories. The radio switch is labeled "Label text with semantic categories as you type." It appears on the semantic categories tab of the autocorrect dialog. In this same dialog box, there will be a user interface to manage which recognizer plug-ins (including the grammar checker program module) are active.

The present invention allows tighter integration between names, dates, times, places, addresses, e-mail addresses, and the information stored in e-mail and personal information managers. For example, using the present invention, the user can type a contact name into their document, select "Insert address" from the user interface and the contact's address will be identified in the personal information manager and inserted directly into the document.

The present invention also provides tighter integration between media objects in an electronic document, such as images, video clips, photographs, audio files, clip art and the like, with other information stored in e-mail contacts and personal information managers. For example, using the present invention, the user may insert a photograph image of a person into a document, and may select an action "insert other photographs of this person" from the user interface. As another example, the user may select an action to send an e-mail with a link to this photograph to the person in the photograph, from within the electronic document. Once a media object has been labeled with a semantic category, any of the many possible actions assigned to the semantic type label are integrated into the electronic document.

As another example of the flexibility of the invention's architecture, a user wants to find a map to a client's business. With the architecture of the present invention, an address will be recognized as such and the user may select "Show map" from a user interface to automatically open the appropriate web page in the web browser and automatically communicate with the mapping service without any user input. The invention saves the user time and eliminating potential transcription errors.

It should be understood that an important aspect of the present invention is that the identification of semantic categories is performed at write time rather than read time. That is, semantic categories are identified, or recognized, by recognizer plug-ins as the user enters information into the document. One reason this is important is that the recognition relies on the writer's computer rather than the reader's computer. This is important because the writer's computer may contain recognizer plug-ins that are not included in the reader's computer. The reader may be presented with the option of downloading an action plug-in or a recognizer plug-in when they receive the document from writer.

The present invention satisfies the need for a system capable of recognizing data in documents on-the-fly and labeling the data with semantic information. After this data is labeled, then a list of actions may be displayed to the user based upon the label associated with the data. It should be understood that the recognizer DLL may distribute any amount of data to the recognizer plug-ins. The invention has been described above in the context of the recognizer DLL sending a paragraph to a recognizer plug-in. However, any amount of data may be sent such as a sentence, a cell, a slide, a media object, a pointer to a media object, metadata about the embedded media object, etc.

Although the present invention has been described above as implemented in a word processing program module, it should be understood that the present invention may be implemented in other program modules, including, but not limited to, HTML authoring programs and programs such as the "POWERPOINT"® presentation graphics program and the "OFFICE" program module, both marketed by Microsoft Corporation of Redmond, Wash.

It should be understood that the recognizer DLL keeps track of pending work, such as the starting and ending position of the paragraph that is to be examined. During idle time, the recognizer DLL sends the paragraph, which may include data related to an embedded media object, to the recognizer plug-ins. If the user dirties data that has been sent to the recognizer plug-ins before the recognizer plug-ins return results, then the recognizer DLL marks the results as invalid. If the user dirties data after it has been checked for semantic categories, then the data is rechecked by the recognizer plug-ins.

As described above, the semantic category may also include metadata returned by the recognizer plug-ins. For example, a recognizer plug-in that recognizes the titles of books may return as metadata an ISDN book number when it recognizes the title of a book. The ISDN book number metadata may then be used to provide actions. Metadata may also be used to disambiguate for actions and searches. For example, suppose a recognizer DLL is linked to a corporate employee database to recognize names. When the recognizer DLL recognizes "Bob Smith," it may store "employeeID=12345" as metadata in the background. Then, when an action is fired, the text in question will be known to reference Bob Smith, employee No. 12345 rather than Bob Smith, employee No. 45678. Also, the metadata may allow searches to be performed independent of the actual text in a document. So, a search may be conducted on "Robert Smith" by looking for employee No. 12345 in the employee databases and by performing a search on the metadata for employee No. 12345 to find documents with "Bob Smith" in them. There are also numerous other functions for metadata. For instance, DHTML could be inserted so special tricks may be performed within a web browser. Additionally, data used by other actions may be inserted such as someone's e-mail address that could be used by the send-mail-to action, a normalized version of the date could be stored to easily interact with a personal information manager, etc.

It should also be understood that limited semantic category information may be sent from the application program module to the recognizer plug-ins. For example, a grammar checker program module may be able to recognize a person's name to create a type label "Person Names." This type label information may be sent to recognizer plug-ins for them to use. For example, a recognizer plug-in that recognizes the names of famous people may not need to search every paragraph that is sent to it. The famous people recognizer plug-in may only need to search strings that have been recognized and labeled as "Person Names" and then determine whether any of these strings is the name of a famous person. As another example, an API may recognize a common type of media object and may apply a label for that media type such as "song," "photograph," "clip art," etc. This type label information may be sent to recognizer plug-ins 220 for further use in obtaining semantic information. For example, a recognizer plug-in for a photograph media object may examine the content of photograph images from a certain device and may apply additional semantic labels to the media object. The recognizer plug-in may only need to search the content of the photograph media object that has been recognized as being of that image device type.

It should be understood that in a preferred embodiment the semantic categories are stored in the native file format, in XML, and in HTML. Of course, the semantic categories may be stored in any file format without departing from the spirit and scope of the present invention.

In one embodiment, the invention comprises annotating data, including strings and media objects in documents with semantic information as the document is created. After a string or media object is annotated with semantic information, a range of actions that utilize both the semantic information and the text of the string-so-labeled may be provided to the user. For example, a word processor program module may use a grammar checker program module to label person names. After a string has been labeled as a person's name, the word processor program module may, through a standard user interface mechanism, allow users to execute actions pertinent to a person's name. For example, the actions may be searching for the person's name in a contacts folder, sending electronic mail to the person's e-mail address, looking up the person's name in a human resources database or inserting a photograph of the person from an annotated photograph album repository. Of course, the examples provided above are simply examples and should not be construed as limiting the present invention.

The architecture of the present invention is designed to allow IT departments or independent vendors to build recognizers for any of these things, which could be deployed within an organization to label these strings and media objects in documents. The IT department or service vendor could also create actions specific to these data types (such as checking the store room for a particular chemical or displaying a spec sheet for it; checking the order backlog for a particular car or the quantity on hand for a particular part; checking the schedule to see when a course is being taught or which department a faculty member is in). It should be understood that recognizer plug-ins can be designed to perform arbitrary computation. For example, a recognizer plug-in could be designed to annotate words found on a list with a particular property (e.g., in order to recognize names of companies). Another recognizer plug-in may annotate stock ticker symbols (by looking for 3 to 5 letter words that are all capitalized). Another recognizer plug-in may query a database to see whether a particular string is a book title. The book title database may be on a local machine, on the corporate Intranet, or halfway around the world and accessible via the Internet. The possibilities for different plug-in designs is endless. As a result of the possible differences between recognizer plug-ins, the recognizer plug-ins will run in a separate thread and the recognizer DLL will be responsible for handling the asynchronicity that will result from different recognizer plug-ins returning their results with different delays.

It should be understood that the present invention is designed to be able to function without any recognizer plug-in DLLs and any action plug-in DLLs. For example, if there are no recognizer plug-in DLLs, semantic categories may still be recognized by a grammar checker program module. If there are no action plug-in DLLs, then the user may be presented with a menu item that allows him to go to a download site to install an action plug-in DLL. The action plug-in DLL and recognizer plug-in DLL may also be combined together into one plug-in DLL.

In alternative embodiments, the recognizer plug-ins may be able to modify the content of a document upon recognition of a semantic category, such as bolding a company's name.

In alternative embodiments, the application program module may fire an event within its object model so that a plug-in that uses the object model could execute a piece of code when a semantic category is recognized (such as to display a special user interface when a semantic category is labeled).

In an alternative embodiment, the language of the text or the type of the embedded media object may be passed to the recognizer DLL or recognizer plug-ins so that analysis of the data may be skipped if the data is an unsupported language or media object type.

In alternative embodiments, word-breaking or sentence-breaking may be done outside of the recognizer plug-ins.

In alternative embodiments, the recognizer plug-ins may be able to examine the content of the document beyond the data it was given. For example, the preceding line in a document may be used to determine whether something is really an address.

It should be understood that a recognizer plug-in is not limited to simply applying labels to text or media objects. Once a recognizer plug-in identifies data as being of a particular type, it may enter the data into a database, send e-mail, start another application, etc.

Although the present invention has been described above as implemented in a preferred application program module, it will be understood that alternative embodiments will become apparent to those skilled in the art to which the present invention pertains without departing from its spirit and scope. Accordingly, the scope of the present invention is defined by the appended claims rather than the foregoing description.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A computer-implemented method for semantically labeling data as the data is added to an electronic document created in an application program module, comprising:

accessing data being added to an electronic document, while monitoring to check if said data has been changed, wherein accessing data being added to an electronic document includes accessing data related to a media object being added to said electronic document;

analyzing said data to recognize semantic information in said data;

if semantic information is recognized, reanalyzing said data to determine if the data has been changed;

determining from reanalyzed data a semantic label for said semantic information;

applying said semantic label to said data, wherein said semantic label is applied to semantic information recognized in said data related to said media object; and modifying the content of said electronic document to reflect said semantic label.

2. The method of claim 1, wherein said data related to a media object is at least one of:
 (a) said media object itself;
 (b) a pointer to said media object; and
 (c) metadata about said media object.

3. The method of claim 2, wherein said metadata about said media object includes a set of properties about said media object.

4. The method of claim 1, wherein said data related to a media object is probabilistic data.

5. The method of claim 4, wherein said probabilistic data is handwriting.

6. The method of claim 5, further comprising applying handwriting recognition to said handwriting and generating a lattice of hypothesis about text associated with said handwriting and wherein accessing data being added to the electronic document includes accessing said lattice of hypotheses.

7. The method of claim 4, wherein said probabilistic data is speech.

8. The method of claim 7, further comprising applying speech recognition to said speech and generating a lattice of hypothesis about text associated with said speech and wherein accessing data being added to the electronic document includes accessing said lattice of hypotheses.

9. The method of claim 1, wherein accessing said data related to a media object includes determining if said media object is a recognized type, and if said media object is not a recognized type, ending the method.

10. The method of claim 1, wherein analyzing said data related to a media object to recognize semantic information includes analyzing data surrounding said media object in said electronic document for semantic information about said media object.

11. The method of claim 1, wherein analyzing said data to recognize semantic information includes comparing said data related to a media object with stored data associated with stored semantic labels to find a match, and if a match is found, determining the stored semantic label associated with said match and applying said stored semantic label to said semantic information recognized in said data related to said media object.

12. The method of claim 1, further comprising displaying an indication that said semantic label has been applied.

13. The method of claim 1, wherein said data related to said media object is accessed by a recognizer dynamic link library and wherein said method also includes said recognizer dynamic link library transmitting said data related to said media object to a plurality of recognizer dynamic link library plug-ins, said plurality of recognizer dynamic link library plug-ins analyzing said data related to said media object to recognize said semantic information, determining said semantic label for said semantic information, and applying said semantic label to said semantic information.

14. The method of claim 1, further comprising:
 determining that a user has selected said media object;
 in response to determining that a user has selected said media object, determining a plurality of actions based on said semantic label for said selected media object; and
 displaying said plurality of actions to the user.

15. The method of claim 14, wherein said semantic label is received by an action dynamic link library and wherein said method also includes said action dynamic link determining said plurality of actions by querying a plurality of installed action dynamic link library plug-ins to determine which of said plurality of action dynamic link library plug-ins apply to said semantic label.

16. The method of claim 14, further comprising:
 determining that said user has selected one of said plurality of actions; and
 in response to determining that said user has selected one of said plurality of actions, causing said application program module to execute said selected action.

17. The method of claim 16, wherein causing said application program module to execute said selected action includes:
 determining whether an action program module assigned to the selected action is available; and
 if an action program module assigned to the selected action is available, receiving instructions from said action program module assigned to the selected action.

18. The method of claim 17, further comprising if an action program module assigned to the selected action is not available, using a Uniform Resource Locator assigned to the selected action to navigate to a Web site and download the action program module.

19. The method of claim 18, wherein said action program module is an action dynamic link library plug-in.

20. The method of claim 1, further comprising determining a plurality of semantic labels and applying said plurality of semantic labels to semantic information recognized in said data related to said media object.

21. A computer-readable storage medium having computer-executable instructions for semantically labeling data as the data is added to an electronic document created in an application program module, the instructions when executed cause the computer to:
 access data being added to an electronic document, while monitoring to check if said data has been changed, wherein the data being added to an electronic document includes data related to a media object being added to said electronic document;
 analyze said data to recognize semantic information in said data;
 if semantic information is recognized, reanalyze said data to determine if the data has been changed;
 determine a semantic label for said semantic information from said reanalyzed data;
 apply said semantic label to said data, wherein said semantic label is applied to semantic information recognized in said data related to said media object; and
 modify the content of said electronic document to reflect said semantic label.

22. The computer-readable storage medium of claim 21, wherein said data related to a media object is at least one of:
 (a) said media object itself;
 (b) a pointer to said media object; and
 (c) metadata about said media object.

23. The computer-readable storage medium of claim 22, wherein said metadata about said media object includes a set of properties about said media object.

24. The computer-readable storage medium of claim 21, wherein said data related to a media object is probabilistic data.

25. The computer-readable storage medium of claim 24, wherein said probabilistic data is handwriting.

26. The computer-readable storage medium of claim 25, wherein the instructions when executed further cause the computer to apply handwriting recognition to said handwriting and generate a lattice of hypothesis about text associated with said handwriting, and wherein accessing data being added to an electronic document includes said lattice of hypotheses.

27. The computer-readable storage medium of claim 24, wherein said probabilistic data is speech.

28. The computer-readable storage medium of claim 27, wherein the instructions when executed further cause the computer to apply speech recognition to said speech and generate a lattice of hypothesis about text associated with said speech and wherein the data being added to an electronic document includes said lattice of hypotheses.

29. The computer-readable medium of claim 21, wherein accessing said data related to a media object includes determining if said media object is a recognized type, and if said media object is not a recognized type, ending the method.

30. The computer-readable storage medium of claim 21, wherein analyzing said data related to a media object to recognize semantic information includes analyzing data surrounding said media object in said electronic document for semantic information about said media object.

31. The computer-readable storage medium of claim 21, wherein analyzing said data to recognize semantic information includes comparing said data related to a media object with stored data associated with stored semantic labels to find a match, and if a match is found, determining the stored semantic label associated with said match and applying said stored semantic label to said semantic information recognized in said data related to said media object.

32. The computer-readable storage medium of claim 21, wherein the instructions when executed further cause the computer to display an indication that said semantic label has been applied.

33. The computer-readable storage medium of claim 21, wherein the instructions when executed further cause the computer to:
determine that a user has selected said media object;
in response to determining that a user has selected said media object, determine a plurality of actions based on said semantic label for said select media object; and
display said plurality of actions to the user.

34. The computer-readable storage medium of claim 33, wherein the instructions when executed further cause the computer to:
determine that said user has selected one of said plurality of actions; and
in response to determining that said user has selected said one of said plurality of actions, cause said application program module to execute said selected action.

35. The computer-readable storage medium of claim 34, wherein causing said application program module to execute said selected action includes:
determining whether an action program module assigned to the selected action is available; and
if an action program module assigned to the selected action is available, receiving instructions from said action program module assigned to the selected action.

36. The computer-readable storage medium of claim 35, further comprising if an action program module assigned to the selected action is not available, using a Uniform Resource Locator assigned to the selected action to navigate to a Web site and download the action program module.

37. A computer-readable storage medium having a computer-executable component for semantically labeling data as the data is added to an electronic document created in an application program module, the computer-executable component comprising:
a user interface for receiving data to be added to an electronic document while monitoring to check if said data has been changed, and if said data is recognized as including semantic information, then reanalyzing said data to determine if said data has been changed and determining from said reanalyzed data a semantic label for said semantic information before displaying an indication of a location of said semantic information in said data being added, wherein said indication includes at least one of:
(a) coloration;
(b) highlighting;
(c) brackets; and
(d) an icon, and
wherein if a plurality of semantic information is recognized in said data being added to an electronic document, the user interface displays a nesting of indications of the locations of said plurality of semantic information.

38. The computer-readable storage medium of claim 37, wherein the data being added includes a media object and the media object includes semantic information.

39. The computer-readable storage medium of claim 38, wherein the media object includes probabilistic data.

40. The computer-readable storage medium of claim 39, wherein the probabilistic data is handwriting.

41. The computer-readable storage medium of claim 39, wherein the probabilistic data is speech.

42. The computer-readable storage medium of claim 37, wherein in response to the user positioning a cursor over an indication of the location of said recognized semantic information, the user interface displaying a semantic label associated with said recognized semantic information and a plurality of actions associated with said semantic label.

43. The computer-readable storage medium of claim 37, wherein said recognized semantic information is a song and wherein said selected one of said plurality of associated actions is at least one of:
creating a playlist of songs by the same artist; and
showing music liked by people who liked the song.

44. The computer-readable storage medium of claim 37, wherein causing said application program module to execute said selected action includes:
determining whether an action program module assigned to the selected action is available; and
if an action program module assigned to the selected action is available, receiving instructions from said action program module assigned to the selected action.

45. The computer-readable storage medium of claim 44, further comprising if an action program module assigned to the selected action is not available, using a Uniform Resource Locator assigned to the selected action to navigate to a Web site and download the action program module.

46. A computer-readable storage medium having a computer-executable component for semantically labeling data as the data is added to an electronic document created in an application program module, the computer-executable component comprising:

a user interface for receiving data to be added to an electronic document while monitoring to check if said data has been changed, and if said data is recognized as including semantic information, then reanalyzing said data to determine if said data has been changed and determining from said reanalyzed data a semantic label for said semantic information before displaying an indication of a location of said semantic information in said data being added, wherein in response to the user positioning the cursor over an indication of the location of said recognized semantic information, the user interface displaying a semantic label associated with said recognized semantic information and a plurality of actions associated with said semantic label; and wherein if a plurality of semantic information is recognized in said data being added to an electronic document the user interface displays a nesting of a plurality of semantic labels and a plurality of actions associated with each of said plurality of semantic labels.

47. The computer-readable storage medium of claim 46, wherein the data being added includes a media object and the media object includes semantic information.

48. The computer-readable storage medium of claim 47, wherein the media object includes probabilistic data.

49. The computer-readable storage medium of claim 48, wherein the probabilistic data is handwriting.

50. The computer-readable storage medium of claim 49, wherein the probabilistic data is speech.

51. A computer-readable storage medium having a computer-executable component for semantically labeling data as the data is added to an electronic document created in an application program module, the computer-executable component comprising:

a user interface for receiving data to be added to an electronic document while monitoring to check if said data has been changed, and if said data is recognized as including semantic information, then reanalyzing said data to determine if said data has been changed and determining from said reanalyzed data a semantic label for said semantic information before displaying an indication of a location of said semantic information in said data being added, wherein in response to the user positioning the cursor over an indication of the location of said recognized semantic information, the user interface displaying a semantic label associated with said recognized semantic information and a plurality of actions associated with said semantic label; and wherein said recognized semantic information is a photograph image and wherein said selected one of said plurality of associated actions is at least one of:
showing photographs taken on the same day;
showing photographs with similar descriptions;
electronically mailing a link to the photograph;
inserting photographs taken on the same day; and inserting photographs having similar descriptions.

52. The computer-readable storage medium of claim 51, wherein the data being added includes a media object and the media object includes semantic information.

53. The computer-readable storage medium of claim 52, wherein the media object includes probabilistic data.

54. The computer-readable storage medium of claim 53, wherein the probabilistic data is handwriting.

55. The computer-readable storage medium of claim 54, wherein the probabilistic data is speech.

56. A data processing system including a processor and memory operable to semantically label data as the data is entered into the electronic document, comprising:
  (a) an application program module for creating an electronic document;
  (b) a recognizer component coupled to the application program module for receiving semantic information in data being added to said electronic document, and for monitoring said data to check if it has been changed;
  (c) a compiler component coupled to the application program module for compiling said data after reanalyzing said data to determine if the data has been changed and before said recognizer component applies a semantic label to any recognized information;
  (d) a user interface component for:
    (i) displaying an indication that a semantic label was applied to recognized semantic information,
    (ii) displaying a plurality of actions associated with said semantic label in response to a user positioning the cursor over said indication, and
    (iii) in response to a user selecting one of said plurality of actions, causing said application program to execute said selected action; and
  (e) an action component coupled to the application program module for performing said selected action.

57. The data processing system of claim 56, wherein the recognizer component recognizes semantic information in data being added to said electronic document and applies a semantic label to recognized semantic information by comparing said data being added to said electronic document to stored data to determine whether said data being added to said electronic document matches any of the stored data and, if a match is found, labeling the data being added to said electronic document with a label associated with the matching stored data.

58. The data processing system of claim 56, wherein the data added to said electronic document includes a media object and wherein if the recognizer component recognizes data related to the media object, the recognizer component compares the data related to the media object to stored data to determine whether the data related to the media object matches any of the stored data and, if the data related to the media object matches any of the stored data, labeling the media object with a label associated with the matching stored data.

59. The data processing system of claim 58, wherein the data added to said electronic document is probabilistic data and wherein if the recognizer component recognizes probabilistic data, the recognizer component compares the probabilistic data to stored data to determine whether the probabilistic data matches any of the stored data and, if the probabilistic data matches any of the stored data, labeling the probabilistic data with a label associated with the matching stored data.

60. The data processing system of claim 59, wherein the probabilistic data is handwriting and the handwriting is semantically labeled as the handwriting is added to said electronic document.

61. The data processing system of claim 60, further comprising a handwriting recognition program module for generating a lattice of hypotheses about text associated with the handwriting and wherein the semantic information received by the recognizer component includes the generated lattices of hypotheses.

62. The data processing system of claim 59, wherein the probabilistic data is speech and the speech is semantically labeled as the speech is added to said electronic document.

63. The data processing system of claim 62, further comprising a speech recognition program module for generating a lattice of hypotheses about text associated with the speech and wherein the semantic information received by the recognizer component includes the generated lattices of hypotheses.

64. The data processing system of claim 56, wherein the recognizer component includes a recognizer dynamic-link library and wherein the data processing system includes at least one recognizer plug-in connected to the recognizer dynamic link library.

65. The data processing system of claim 64, including a plurality of recognizer plug-ins connected to the recognizer dynamic link library, said dynamic link library transmitting said data related to said received semantic information to said plurality of recognizer plug-ins and, if any of said plurality of recognizer plug-ins recognize semantic information in said received semantic information, said recognizer plug-in determining a semantic label, applying said semantic label to said recognized semantic information, and transmitting said semantic label to said dynamic link library.

66. The data processing system of claim 65, wherein said recognizer dynamic-link library transmits said semantic label to said application program module.

67. The data processing system of claim 66, wherein said recognizer dynamic link library synchronizes plural semantic labels received from said plurality of recognizer plug-ins before transmitting said plural semantic labels to said application program module.

68. The data processing system of claim 56, further comprising:
    an action component connected to the application program module operable to perform said selected action.

69. The data processing system of claim 68, wherein the action component includes an action dynamic-link library and at least one action plug-in connected to the action dynamic link library.

70. The data processing system of claim 69, wherein performing said selected action includes:
    said action dynamic link library determining whether an action plug-in dynamic link library assigned to the selected action is available; and
    if an action plug-in dynamic link library assigned to the selected action is available, receiving instructions from the action plug-in dynamic link library assigned to the selected action.

71. The data processing system of claim 70, further comprising if an action plug-in dynamic link library assigned to the selected action is not available, using a Uniform Resource Locator associated with the selected action to navigate to a Web site and download the action plug-in dynamic link library.

* * * * *